(12) United States Patent
Long

(10) Patent No.: US 12,145,404 B2
(45) Date of Patent: Nov. 19, 2024

(54) SYSTEMS AND METHODS FOR PROVIDING WHEELS HAVING VARIABLE SPRING RATES

(71) Applicant: Berkshire Grey Operating Company, Inc., Bedford, MA (US)

(72) Inventor: Guoming Alex Long, Pittsburgh, PA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 556 days.

(21) Appl. No.: 16/986,349

(22) Filed: Aug. 6, 2020

(65) Prior Publication Data

US 2021/0039431 A1 Feb. 11, 2021

Related U.S. Application Data

(60) Provisional application No. 62/884,795, filed on Aug. 9, 2019.

(51) Int. Cl.
*B60B 9/04* (2006.01)
*B60B 9/26* (2006.01)
*B60C 7/14* (2006.01)

(52) U.S. Cl.
CPC .......... *B60B 9/04* (2013.01); *B60B 9/26* (2013.01); *B60C 7/146* (2021.08); *B60C 7/14* (2013.01)

(58) Field of Classification Search
CPC .... B60B 9/04; B60B 9/26; B60C 7/14; B60C 7/143; B60C 7/146; B60C 7/18; B60C 7/107
USPC ...................................... 152/7, 43
See application file for complete search history.

(56) References Cited

U.S. PATENT DOCUMENTS

| 1,021,440 | A | * | 3/1912 | Arnold et al. | ............ B60B 9/26 |
| | | | | | 152/84 |
| 1,105,932 | A | * | 8/1914 | Smith | ....................... B60B 9/26 |
| | | | | | 152/72 |
| 1,524,718 | A | * | 2/1925 | Leach | ..................... B60C 7/107 |
| | | | | | 152/326 |
| 2,016,095 | A | | 10/1935 | Martin et al. | |
| 3,219,090 | A | | 11/1965 | Cislo | |
| 4,553,577 | A | * | 11/1985 | Gregg | ....................... B60B 9/26 |
| | | | | | 152/80 |

(Continued)

FOREIGN PATENT DOCUMENTS

| CN | 1069232 A1 | 2/1993 |
| CN | 1822962 A | 8/2006 |

(Continued)

OTHER PUBLICATIONS

Notification Concerning Transmittal of International Preliminary Report on Patentability and International Preliminary Report on Patentability issued by the International Bureau of WIPO in related International Application No. PCT/US2020/045141 on Feb. 17, 2022, 13 pages.

(Continued)

*Primary Examiner* — Kip T Kotter
(74) *Attorney, Agent, or Firm* — Gesmer Updegrove LLP

(57) ABSTRACT

A wheel is disclosed that includes an inner hub, an outer rim, and a plurality of resilient elements that exhibit a first spring constant that is the same for all elements, and a second spring constant that is higher than the first spring constant for elements being compressed beyond a threshold deflection.

21 Claims, 22 Drawing Sheets

(56) References Cited

U.S. PATENT DOCUMENTS

| | | | |
|---|---|---|---|
| 5,343,916 A * | 9/1994 | Duddey | B60C 7/107 |
| | | | 152/5 |
| 7,467,407 B2 | 12/2008 | Yen | |
| 8,104,524 B2 | 1/2012 | Manesh et al. | |
| 8,109,308 B2 | 2/2012 | Manesh et al. | |
| 10,625,934 B2 | 4/2020 | Mallady | |
| 2005/0133133 A1* | 6/2005 | Becker | B60C 7/107 |
| | | | 152/323 |
| 2006/0045672 A1 | 3/2006 | Maynard et al. | |
| 2006/0144488 A1* | 7/2006 | Vannan | B60C 7/14 |
| | | | 152/7 |
| 2009/0211678 A1* | 8/2009 | Palinkas | B60C 17/061 |
| | | | 152/209.18 |
| 2010/0132858 A1 | 6/2010 | Arakawa et al. | |
| 2010/0292841 A1 | 11/2010 | Wickham | |
| 2013/0340902 A1 | 12/2013 | Kemeny | |
| 2015/0104282 A1 | 4/2015 | Toebes et al. | |
| 2015/0259077 A1 | 9/2015 | Wiskus | |
| 2015/0307276 A1 | 10/2015 | Hognaland | |
| 2016/0096400 A1* | 4/2016 | Nomura | B60B 9/04 |
| | | | 152/69 |
| 2016/0167434 A1* | 6/2016 | Nishida | B60B 9/26 |
| | | | 152/12 |
| 2016/0167706 A1 | 6/2016 | Van Meijl et al. | |
| 2016/0304278 A1 | 10/2016 | Hognaland | |
| 2016/0304281 A1 | 10/2016 | Elazary et al. | |
| 2016/0325932 A1 | 11/2016 | Hognaland | |
| 2017/0080846 A1 | 3/2017 | Lord et al. | |
| 2017/0341469 A1 | 11/2017 | Choi | |
| 2018/0305122 A1 | 10/2018 | Moulin et al. | |
| 2018/0305126 A1 | 10/2018 | Moulin et al. | |
| 2018/0312334 A1 | 11/2018 | Winkler | |
| 2018/0346022 A1 | 12/2018 | Payeur | |
| 2019/0129371 A1 | 5/2019 | Wagner et al. | |
| 2019/0210803 A1 | 7/2019 | Sullivan et al. | |
| 2019/0295591 A1 | 9/2019 | Pajevic et al. | |
| 2020/0031640 A1 | 1/2020 | Hognaland | |
| 2020/0216298 A1 | 7/2020 | Gravelle et al. | |
| 2020/0324573 A1* | 10/2020 | Tardiff | B60B 9/04 |
| 2021/0086782 A1 | 3/2021 | Austrheim | |
| 2022/0153519 A1 | 5/2022 | Popa et al. | |
| 2022/0260982 A1 | 8/2022 | Austrheim et al. | |
| 2023/0050980 A1 | 2/2023 | Zahdeh et al. | |
| 2023/0069056 A1 | 3/2023 | Zahdeh et al. | |
| 2023/0097961 A1 | 3/2023 | Clark et al. | |
| 2023/0102969 A1 | 3/2023 | Whelan et al. | |
| 2023/0106919 A1 | 4/2023 | Johannisson | |
| 2023/0142253 A1 | 5/2023 | Heggebø | |
| 2023/0166912 A1 | 6/2023 | Austrheim et al. | |
| 2023/0234780 A1 | 7/2023 | Austrheim et al. | |

FOREIGN PATENT DOCUMENTS

| | | | | |
|---|---|---|---|---|
| CN | 2019313931 U | | 8/2011 | |
| CN | 109720148 A1 | | 5/2019 | |
| EP | 2769852 A1 | | 8/2014 | |
| EP | 3135498 A1 | | 3/2017 | |
| GB | 191219591 A | | 3/1913 | |
| JP | 2007112243 A | | 5/2007 | |
| KR | 20060083846 A | * | 7/2006 | |
| WO | WO-0078560 A1 | * | 12/2000 | B60B 5/02 |
| WO | WO-2010012091 A1 | * | 2/2010 | B60B 9/04 |
| WO | WO-2011049407 A2 | * | 4/2011 | B60C 7/12 |
| WO | 2012017202 A1 | | 2/2012 | |
| WO | 2015140216 A1 | | 9/2015 | |
| WO | 2017106723 A1 | | 6/2017 | |
| WO | 2019010432 A1 | | 1/2019 | |

OTHER PUBLICATIONS

Communication pursuant to Rules 161(1) and 162 EPC issued by the European Patent Office in related European Patent Application No. 20764491.5 on Mar. 16, 2022, 3 pages.

Eaminer's Report issued by the Innovation, Science and Economic Development Canada (Canadian Intellectual Property Office) in related Canadian Patent Application No. 3,150,286 on Mar. 10, 2023, 5 pages.

Notice on the First Office Action issued by the China National Intellectual Property Administration in related Chinese Patent Application No. 202080056552.8 on May 10, 2023, 21 pages.

Annex to Form PCT/ISA/206 Communication Relating to the Results of the Partial International Search and Provisional Opinion Accompanying the Partial Search Result in related International Application No. PCT/US2020/045141 issued by the European Patent Office on Nov. 23, 2020, 11 pages.

International Search Report and Written Opinion issued by the International Searching Authority, the European Patent Office, in related International Application No. PCT/US2020/045141 on Jan. 20, 2021, 19 pages.

Notice on the Second Office Action issued by the China National Intellectual Property Administration in related Chinese Patent Application No. 202080056552.8 on Nov. 18, 2023, 24 pages.

Examiner's Report issued by the Innovation, Science and Economic Development Canada (Canadian Intellectual Property Office) in related Canadian Patent Application No. 3,150,286 on Apr. 10, 2024, 4 pages.

Communication pursuant to Article 94(3) EPC issued by the European Patent Office in related European Patent Application No. 20764491.5 on Sep. 14, 2023, 4 pages.

* cited by examiner

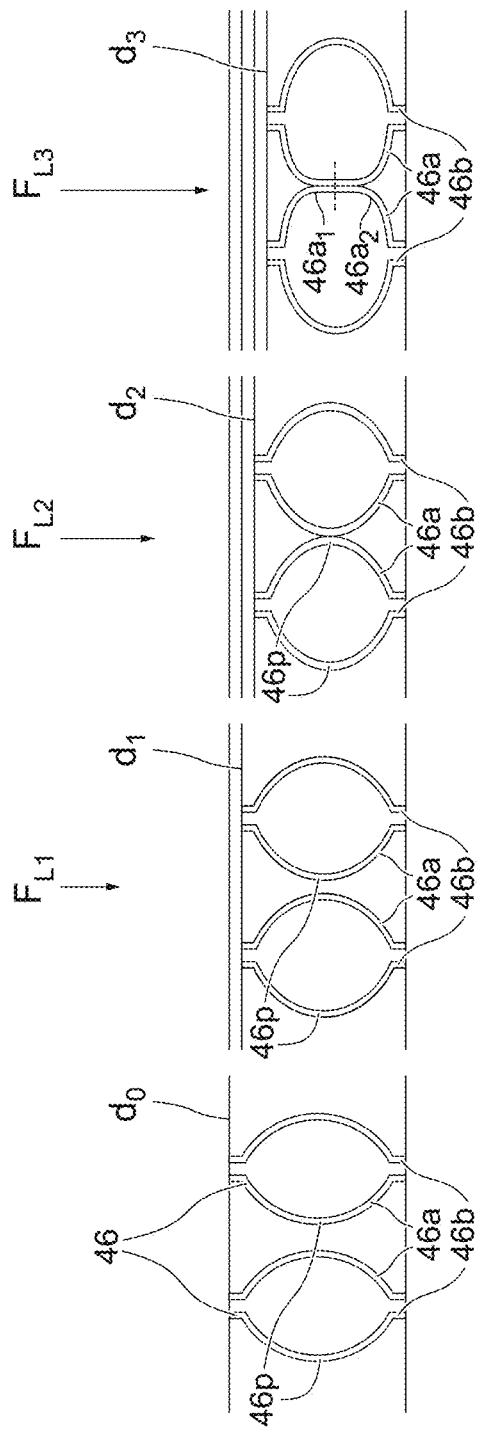

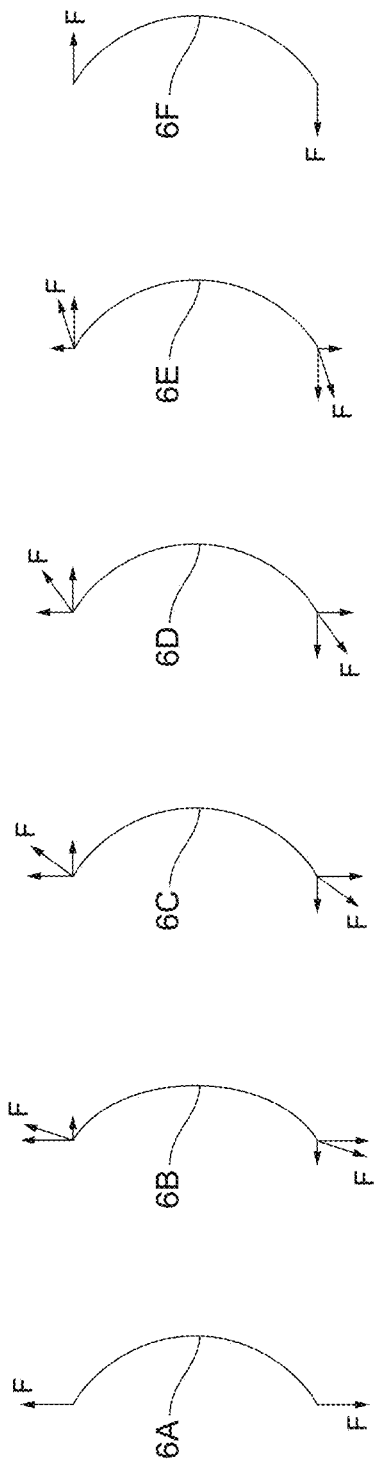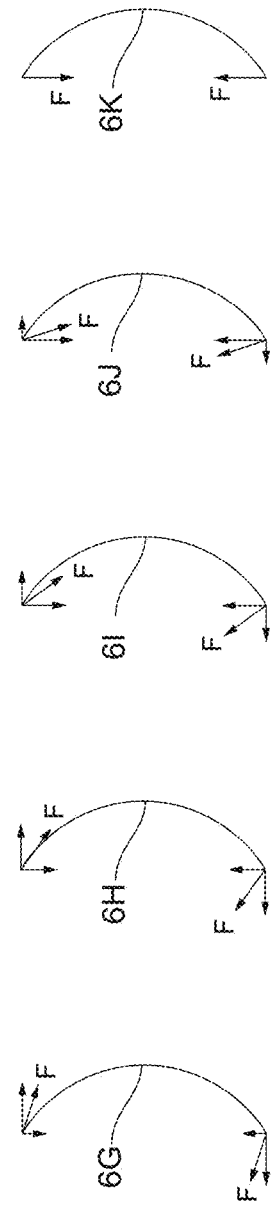

SYSTEMS AND METHODS FOR PROVIDING WHEELS HAVING VARIABLE SPRING RATES

PRIORITY

The present application claims priority to U.S. Provisional Patent Application Ser. No. 62/884,795, filed Aug. 9, 2019, the disclosure of which is hereby incorporated by reference in its entirety.

BACKGROUND

The invention generally relates to resilient wheel assemblies, and relates in particular to wheel assemblies having resilient interfaces between the wheel hub and the outer wheel.

Two fundamental problems with multi-wheel vehicles include maintaining contact, or traction, with the driving surface, and limiting transmission of forces to the vehicle platform. For traction, the wheels should exert consistent and adequate force on the driving surface such that the static friction limit between those wheels and the driving surface is not overcome by the forward force of the powered wheels or lateral forces on wheels while turning. A loss of traction results in a decreased ability to control the vehicle's speed or trajectory. The vehicle may need to reduce power to the wheels or otherwise reduce the speed of the vehicle to regain traction. Accelerations and decelerations must be less aggressive to prevent slipping, which increases the time to start and stop the vehicle.

Similarly, limiting the transmission of forces to the vehicle platform is dependent on the connections between the platform and the ground, as well as the speed of the vehicle. The more rigid or stiff the linkage is between the outer surface of the wheel and the vehicle platform, the more that contours and imperfections in the driving surface will be felt at the platform, potentially damaging the vehicle or carried cargo. Slowing the vehicle or providing vibration dampening between the driving surface and the vehicle platform can reduce the intensity of the transmitted motion, shocks, and vibrations. Addressing vibrations through reduced speed however, leads to decreased vehicle operating efficiency. The choice therefore, of vehicle linkage is integral in maintaining safety and operating efficiency.

In the field of mobile programmable motion device systems, e.g., robots, that maneuver within a warehouse or order fulfillment center, additional considerations impact the design of the linkage. While traction and force isolation remain fundamentally important, the choice of linkage must also consider affordability, efficiency, and maintaining acceptable ride height.

To effectively run an automated warehouse, a great number of mobile programmable motion devices (mobile devices) are used to bring packages to and from various locations within the warehouse due to large sizes of contemporary warehouses and the increased number of orders that must be fulfilled. Because of the high number of mobile devices required, the cost per mobile device plays a large role in the system's profitability. Cost per mobile device includes the cost to make or acquire the mobile device as well as the cost to operate, maintain and repair the mobile device throughout the useful life of the mobile device. The mobile device's complexity is typically proportional with each of these costs. An increased number of parts leads to more expensive manufacturing, more parts to wear or break, and shorter operating life. Increased complexity is also associated with increased operating costs, as there are more frictional contact points or parts to flex, which lead to wasted energy while operating. The weight of the mobile device may also increase, which requires more energy to accelerate or slow the mobile device.

Operating efficiency of each mobile device is also challenged by increased complexity. The mobile devices must be able to maintain a high throughput during use, reducing downtime and optimizing uptime. Efficiency goes down when the mobile device slows down while in use, or needs to be taken out of use for maintenance or repair. Slowing down to maintain traction, or stopping to recharge batteries, put air in tires, or replace cargo that has vibrated off its platform are examples of this. Further, designing the mobile devices to maintain high average speeds increases efficiency. This can be accomplished through quicker accelerations and decelerations, and faster cornering.

Maintaining acceptable ride height is also important in automated warehousing. Order fulfillment centers rely on standardized shelving, conveyors, and other hardware. Mobile devices should be able to predictably retrieve from and place objects onto the hardware. Objects that are transported within the warehouse can vary in weight dramatically. If the mobile device deflects downward too much under a heavy load, or remains too tall under light loads, proper transfer of objects may not occur.

Conventional solutions do not address all of the aforementioned issues present in an automated warehouse environment. Vehicles typically have two ways to absorb the transmission of forces and maintain ground pressure: 1) through a suspension system attached to a wheel's axle, or 2) through compliant wheels that allow deflection of the wheel itself.

Suspension systems, including shock absorbers, springs, and other linkages, connect a vehicle to its wheels and allow relative motion therebetween to absorb bumps, counter vehicle body roll around corners, or otherwise absorb forces applied to the vehicle through its wheels. Suspensions acting on the wheel's axle allow the entire wheel to move along the contours of the driving surface and soften the impacts and sudden deflections of the wheel during travel due to unevenness of, or objects on, the driving surface.

Axle suspension systems may be tuned to accommodate desired ride characteristics, such to provide as a softer, longer traveling suspension for comfortable rides, to provide isolating vibrations more from the main vehicle body at the expense of performance, or to provide shorter, tighter suspension that may make for a harsher ride, but one that maintains better weight distribution, and therefore traction, while cornering, braking, and accelerating. One drawback of this type of suspension system is that the directionality of the absorption, typically straight up and down, does not absorb shocks from forces acting on the wheel at an angle away from vertical, such as when traveling over a pot hole or other large driving surface imperfections. In these instances, the force component in the direction of the suspension would be absorbed, but force components perpendicular to the suspension will be transmitted and felt by the vehicle body. Linear suspension systems also add complexity to the vehicle, requiring that the wheels be mounted on a movable linkage structure, with one end of the suspension fixed to the car and the other end pushing against the linkage. This added mechanical complexity adds cost and introduces more modes of failure, which ultimately leads to more downtime for vehicle maintenance and repairs.

Compliant wheels may help reduce the transmission of forces while maintaining ground contact by deforming a part of the wheel itself. This compliance is most commonly used as a resilient ground-engaging material such as an air-filled rubber tire (or inner tube), or a solid rubber tread; a resilient interface between the wheel's inner hub and outer ground-engaging rim may also be employed.

Pneumatic tires provide good traction and vibration isolation, and are relatively inexpensive to manufacture, but operating efficiency and high management inhibit them from being a good fit for warehouse mobile devices. FIG. 1, for example, shows a standard pneumatic bicycle wheel assembly 70 including a tire 70 (and inner tube not shown) mounted on a rim 74 that is connected to a hub 72 via spokes 76. FIG. 2 shows a standard pneumatic automotive tire wheel assembly 80 that includes a tire body 88 mounted on a rim 84 of a hub 82. Air filled tires require close monitoring of air pressure levels, punctures, and wear, which reduces their operating efficiency. Inflation pressure may be provided that accommodates an intended contact area, rolling resistance, bounce, and lateral roll. Inflation pressures that are too high or too low may lead to premature and uneven wear, reduced rolling efficiency, unstable cornering, reduced braking efficiency, and a higher likelihood of puncturing the tire, causing a flat. Inflation pressure is further affected by temperature, requiring monitoring and control of the working environment and/or the tire pressure. Ride height also suffers because the air-filled tire compresses linearly as loading increasing; the decrease in height may create problems when trying to load and unload cargo.

Resilient ground engaging materials rely on the hardness of the material used, its viscoelastic properties, the shape or texture of the ground-engaging elements, and the duration of contact to absorb or mitigate ground reaction forces. Generally, softer, more elastic materials provide better traction and dampen vibrations better than harder, more inelastic materials. Harder materials, however, provide lower rolling resistance and tend to be more resistant to wear, increasing the overall efficiency of the wheel. Air-less tires have also been developed as disclosed, for example, in U.S. Pat. Nos. 2,016,095, 8,104,524 and 8,109,308, as well as marketed under the brand Michelin X Tweel Air-Less Radial Tire by Michelin North America of South Greenville, North Carolina.

FIGS. 3 and 4, for example, show air-less wheel assemblies 90 that include a hub 92 that is coupled to a rim 94 via a resilient interface 95 that includes a plurality of resilient spokes (e.g., 96a, 96b). The wheel assemblies may also absorb forces through a resilient interface coupling the hub and rim. The resilient interface is generally an arrangement of deformable material(s) or structure(s) that exhibit a predominantly smooth and continuous restoring force throughout a minimum and maximum deflection. Conventional resilient interfaces rely on materials that are strong in tension, but are easily deformable when compressed in order to conform to ground height variations. This weakness under load may compromise the maintenance of ride height as loads increase.

There remains a need therefore, for a wheel that is hard enough for increased durability and lower coefficient of friction, while providing enough compliance that a suspension is not needed on chassis, and so that all four wheel make contact with the ground at all times. The wheel should also be radially compliant without compromising lateral stiffness, and must limit the variation of the vehicle's ride height under a variety of operational loads. There further remains a need for a wheel that is inexpensive and efficient to make and effectively use over a range of expected driving conditions.

SUMMARY

In accordance with an aspect, the invention provides a wheel having an inner hub, an outer rim, and a plurality of resilient elements that exhibit a first spring constant that is the same for all elements, and a second spring constant that is higher than the first spring constant for elements being compressed beyond a threshold deflection.

In accordance with another aspect, the invention provides a wheel comprising an inner hub, an outer rim, and a plurality of resilient elements extending in a generally radial direction. The elements have an arcuate portion extending in one of two circumferential directions, where the elements are arranged in an alternating pattern with regards to the circumferential direction of the element's arcuate portion.

In accordance with a further aspect, the invention provides a wheel interface for a non-pneumatic wheel defining radial and circumferential directions, the wheel interface includes a plurality of resilient members, each resilient member extending in a radial direction from an inner connection portion to an outer connection portion with a resilient portion between the inner and outer connection portions, the resilient portion being curved in one of a first circumferential direction or a second circumferential direction, wherein each element with a resilient portion curved in a first direction is adjacent to a element with a resilient portion curved in the second circumferential direction.

In accordance with a further aspect, the invention provides a non-pneumatic wheel comprising a hub defining an axis of rotation of the wheel and having an outer attachment surface, a rim having an outer ground-engaging surface and an inner attachment surface, a plurality of resilient elements extending between the outer attachment surface and inner attachment surface, the elements having a curved surface having an apex in a circumferential direction, wherein, the elements are arranged to define pairs of opposed elements spaced circumferentially around the wheel, wherein the opposed elements are curved in generally opposite and facing directions, and wherein, upon compression of the elements as the hub and rim move towards one another, the curved surfaces bow in the direction of their curvature during a first compression stage, and upon making contact with an adjacent curved leaf spring, begin a second compression stage during which the curved surfaces are prevented from bowing further in the direction of their curvature.

In accordance with a further aspect, the invention provides a vehicle including a vehicle platform, a plurality of wheels, each wheel having a hub, a rim, and a resilient interface between the hub and rim, and a plurality of powertrains that provide power to the wheels through the hubs, wherein, the wheels transfer power from the hubs to the rims to accelerate differently in one rotational direction than the other rotational direction.

In accordance with a further aspect, the invention provides a method of powering a vehicle having a first set of wheels and a second set of wheels, the method comprising providing a vehicle having wheels with a hub, a rim, and a resilient interface between the hub and rim, powering the first set of wheels to accelerate in the first direction while the second set of wheels freely rotates, braking the second set of wheels to slow movement in the first direction while the first set of wheels freely rotates; and powering the second set of wheels to accelerate in the second direction while the first set of wheels freely rotates, and braking the first set of wheels to slow movement in the second direction while the second set of wheels freely rotates.

BRIEF DESCRIPTION OF THE DRAWINGS

The following description may be further understood with reference to the accompanying drawings in which:

FIGS. 8A-8D show illustrative diagrammatic views of resilient portions of the wheel of FIG. 5 under various levels of compression;

FIGS. 10A-10K show illustrative diagrammatic views of the forces acting on the resilient portions shown in FIGS. 9A-9D;

DETAILED DESCRIPTION

In accordance with an aspect, the invention provides an efficient wheel that is constructed with resilient elements to maintain traction, isolate ground forces, and manage vehicle height under varying loads. In accordance with certain aspects, the wheel may be constructed with resilient elements that allow for bouncing. A wheel is therefore provided that can roll and bounce. In accordance with further aspects, the invention provides a system having multiple wheels, and in accordance with yet further aspects, such a system where the wheels are different.

Figure 5:
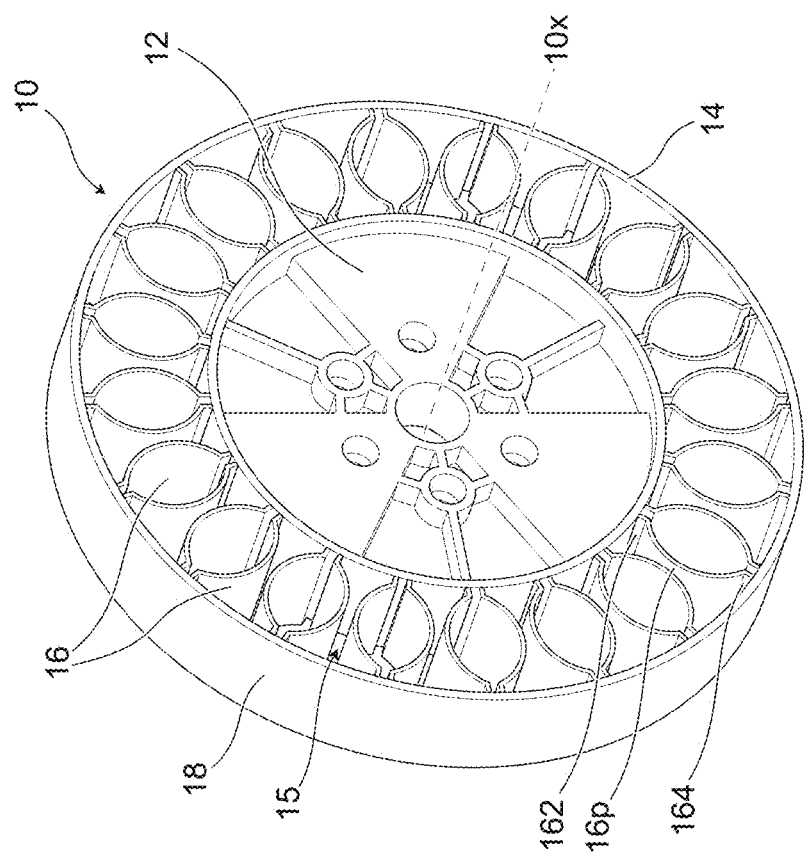
FIG. 5 shows an illustrative diagrammatic isometric view of a wheel in accordance with an aspect of the present invention.

As shown in FIG. 5, wheel 10 has a rigid inner hub 12, a substantially rigid outer rim 14, and a resilient interface 15 disposed in the space between the hub 12 and rim 14. The resilient interface 15 is comprised of a series of resilient elements 16 spaced around the wheel. The elements 16 extend generally in the radial direction between the hub 12 and rim 14. Hub 12 rotates about an axis of rotation 10x. The hub 12 can be driven by a power source, such as an electric motor, or can be unpowered and freely rotate. Resilient interface 15 transfers the rotational forces between the hub 12 and the outer surface 18 of the rim 14.

Wheel 10 may be formed as a single monolithic structure that is injection molded, 3D printed, or otherwise formed as a whole. The material used for the structure preferably has some resiliency to be able to provide adequate traction under a variety of conditions, while also having the strength to support intended loads. The elasticity should also be adequate to urge the outer surface 18 against the driving surface to maintain traction and mitigate transmission of vibration to the vehicle while traveling over rough surfaces or areas with rapid changes in surface heights.

In accordance with an aspect therefore, the invention provides a resilient interface between a hub and a rim that includes spring elements that act in both tension and compression to support the hub. As opposed to a simple linear spring, however, the spring elements are arranged to contact adjacent elements when they deflect under load conditions. This contact dramatically changes the spring rate of the elements, significantly stiffening the interface against further deflection.

Resilient elements 16 are formed as pre-bent (e.g., molded) leaf springs that extend substantially the full width of the wheel, providing lateral stability. The bend in the resilient elements 16 alternate, so that each element will be bent toward another element that is likewise bent towards it. Elements 16 have a hub connection portion 162 that rigidly connects the elements 16 to the hub, and a rim connection portion 164 that rigidly connects the elements 16 to the rim 14. Between the hub connection portion 162 and the rim connection portion 164 there is a peak 16p, which is the point farthest from a line passing through the hub connection portion 162 and the rim connection portion 164. The elements 16 have substantially the same spring constant in tension as in compression until, when so compressed as to contact an adjacent element as described in more detail below, the element becomes much stiffer (i.e., has a higher effective spring constant).

In accordance with various aspects, therefore, the invention provides a wheel having a resilient interface between a hub and a rim that can act in both tension and compression to supports a vehicle. The resilient interface uses curved resilient elements spaced around the wheel that bow outward when compressed. When compressed beyond a threshold level the elements will contact an adjacent element, causing the stiffness of the elements to increase dramatically, limiting further deflection. This dual spring rate system allows a vehicle to maintain a vehicle height under large range of loads while having enough resilience to maintain traction with the driving surface.

Figure 6:
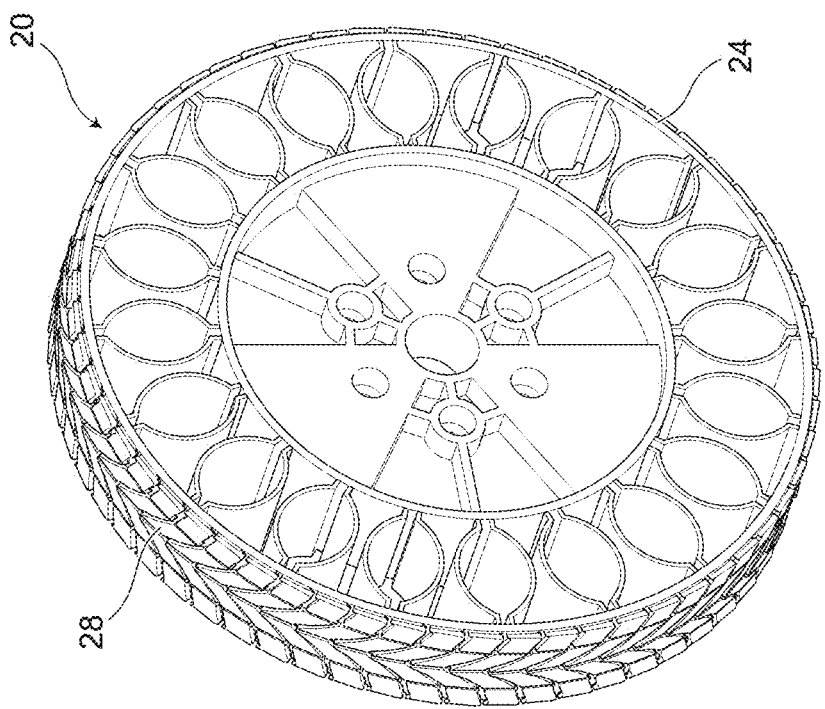
FIG. 6 shows an illustrative diagrammatic isometric view of the wheel of FIG. 5 including a textured tread.

FIG. 6 shows another aspect of the wheel where the outer surface 18 includes a textured tread 28. The tread 28 may be formed of the same material as the rest of the wheel 20, or may be formed from a layer of elastic or highly frictional material molded or otherwise fitted to the outer surface 28 of the rim 24. This tread 28 may provide improved traction through enhanced frictional contact with a driving surface. Friction will be impacted by several factors, including the material chosen, the texture of the ground engaging surface, the contact footprint under various loads, presence of liquids or thin films, and temperature. If the tread 28 is made from a separate material from the rest of the wheel, it can be selected to provide another layer of resiliency to the wheel by absorbing energy from bumps or vibrations transferred from the driving surface.

Figure 7:
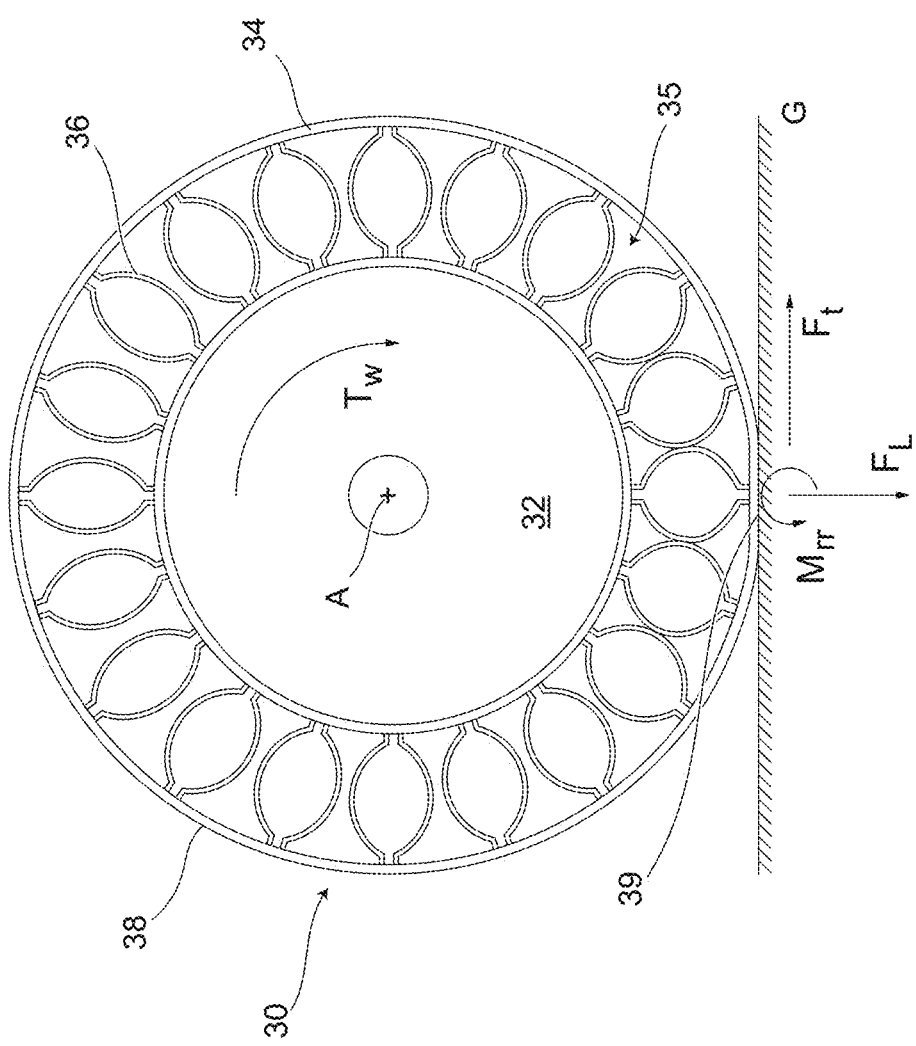
FIG. 7 shows an illustrative diagrammatic side view of forces acting on the wheel of FIG. 5.

Typical forces that act on a wheel 30 are shown in FIG. 7. The weight of the vehicle and its cargo applies a downward load force $F_L$ that causes element 36 and outer rim 34 to deflect. If the wheel 30 is powered, a torque $T_w$ is applied to hub 32 to cause rotation about axis A. The torque $T_w$ is transferred through resilient interface 35 to the rim 34. The ground G then applies a reactive tractive force Ft to the outer surface 38 of the rim 34 to cause the wheel to turn. Once the wheel 30 begins turning, a rolling resistance moment $M_{rr}$ is created in the outer surface 38 acting to oppose the rotation. This rolling resistance moment $M_{rr}$ is primarily caused by the hysteresis in tire materials due to the deflection of the outer surface material while rolling. The leading half of the tire's contact patch 39 is compressed, which rebounds with lower energy as the wheel rolls on and the compression is released. In order to reduce this rearward force, the tire may be made of a harder material that deforms less, or the contact patch area may be reduced by decreasing the load force $F_L$, by designing the outer rim 38 to be stiffer, or by changing the geometry of the outer surface 38. Certain of these solutions however, may have the drawback of reducing traction.

FIGS. 8A-8D illustrate the compression of elements 46 in an illustratively simplified manner where the elements 46 are side by side with vertically applied forces. FIG. 8A shows four alternating elements 46 in an uncompressed state, with a deformation level of $d_0$. Elements 46a are bent toward one another, while elements 46b are bent away from elements 46a, and, for the purposes of this example, do not face another element. Each of the elements 46 has a peak 46p. In FIG. 8B, the elements 46 have been compressed under a load $F_{L1}$ to deformation level $d_1$. As the elements 46 are compressed, the peaks 46p extend farther out. In FIG. 8C, force $F_{L2}$ has deflected the elements 46 to deflection level $d_2$. This has caused the elements 46a to bend to a point where their peaks 46p have contacted one another, and cannot move outwardly any further. In FIG. 8D, increased force $F_{L3}$ has deflected the elements 46 to deflection level $d_3$. Peaks 46p of adjacent elements 46a have begun to flatten against one another. The force required to deflect elements 46a to this level is different from the force it takes to move the unconstrained elements 46b the same amount. This is due to the change in the spring rate, or spring constant k, when the peaks 46p become constrained.

To calculate the increased spring constant of adjacent elements between its unconstrained and constrained states, the process begins with the equation:

$$F=kd$$

where F is the force applied, k is the spring constant of the spring, and d is the deflection of the spring. The deflection of the spring element may be approximated using the equation for the deflection of a beam with rectangular cross section:

$$\delta = \frac{qFL^3}{Ebt^3}$$

where
q=a constant based on boundary conditions of the beam
F=the force applied to the beam
L=the length of the beam
E=the Modulus of Elasticity of the beam material
b=the width of the beam
t=the thickness of the beam Thus, the original effective spring constant of two adjacent but non-touching elements may be calculated by finding their equivalent unconstrained spring constant. For each element, the spring constant is calculated as:

$$k_1 = \frac{F}{\delta_{des}} = \frac{Ebt^3}{qL^3}$$

Because the two springs act in parallel, their effective spring constant is:

$$k_{eff1}=k_1+k_1=2k_1$$

As the spring elements 46a deflect and contact the adjacent element 46a, the effective length of the leaf spring is halved, with upper parts $46a_1$ and lower parts $46a_2$ of the elements 46a acting as springs in parallel. The resultant effective spring constant $k_{eff2}$ of the two touching, constrained elements is a combination of the two halved segments of each elements in series, being in parallel with the adjacent two segments that are in series. Each half segment will have the new constant:

$$k_2 = \frac{Ebt^3}{q\left(\frac{L}{2}\right)^3} = 8 * \frac{Ebt^3}{qL^3} = 8k_1$$

With the two halves in series, each elements will have a new constant of:

$$k_{series} = \left(\frac{1}{k_2} + \frac{1}{k_2}\right)^{-1} = \frac{k_2}{2}$$

$$k_{eff2} = k_{series} + k_{series} = \frac{k_2}{2} + \frac{k_2}{2} = k_2 = 8k_1$$

To understand the change in spring constant, review the ratio of $k_{eff2}$ and $k_{eff1}$:

$$\frac{k_{eff2}}{k_{eff1}} = \frac{8k_1}{2k_1} = \frac{4}{1}$$

The effective spring constant is therefore four times the old spring constant, which means that it takes four times the load force to compress the constrained elements 46a to the same deformation level as the unconstrained elements 46b.

Figure 9B:
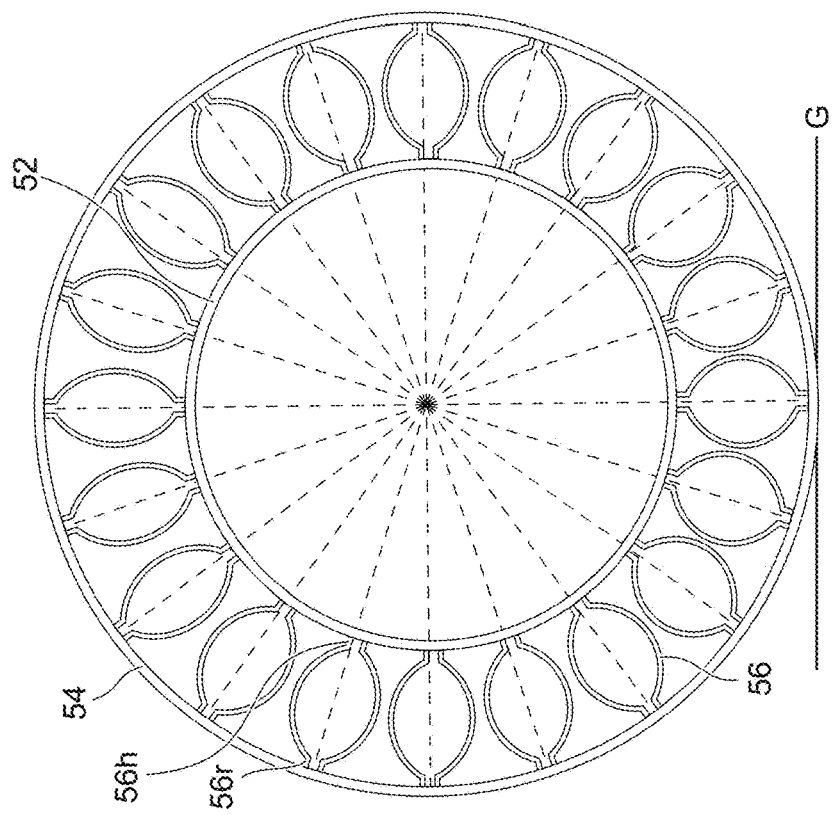
FIGS. 9A-9D show illustrative diagrammatic views of the wheel of FIG. 5 under various levels of compression.
Figure 9A:
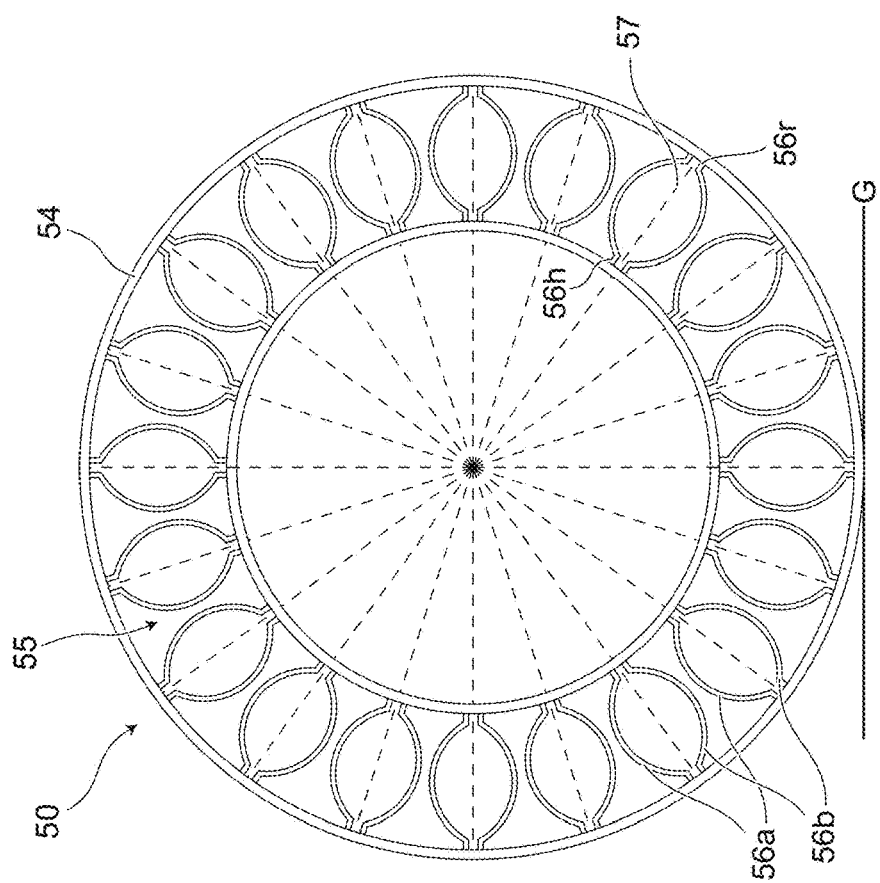

Adjacent elements around a wheel deflect a little differently, but the concept remains the same. FIGS. 9A-9D show wheel 50 through four stages of deflection of the resilient interface 55, where the inner hub 52 deflects downward toward the ground G. Outer rim 54 remains rigid, with dashed centerlines 57 illustratively emanating from the center of the outer rim 54. When un-deflected as shown in FIG. 9A, centerlines 57 pass between the hub attachment portions 56h and rim attachment portions 56r of adjacent elements 56a and 56b that are curved away from one another. As the hub 52 moves downward, each hub connection portion 56h of element 56 moves with it. For each element 56 around the wheel 50, the hub connection portion 56h moves relative its corresponding rim connection portion 56r. In FIG. 9B, the elements 56 have begun to deflect, but adjacent elements that are curved toward one another have not yet made contact. At this stage, the elements closest to the ground G are in compression with the same spring constant as the elements farthest from the ground G, which are in tension. In FIG. 9C, adjacent elements 56 closest to the ground G have begun to make contact with one another, greatly increasing the spring constant of the lower elements to stiffen the resilient interface 55, while the elements 56 farthest from the ground G continue to act on the hub 52 in tension at the original unconstrained spring constant. As the hub 52 continues to deflect as in FIG. 5D, more elements 56 begin making contact with one another, further stiffening the resilient interface 55.

Figure 9D:
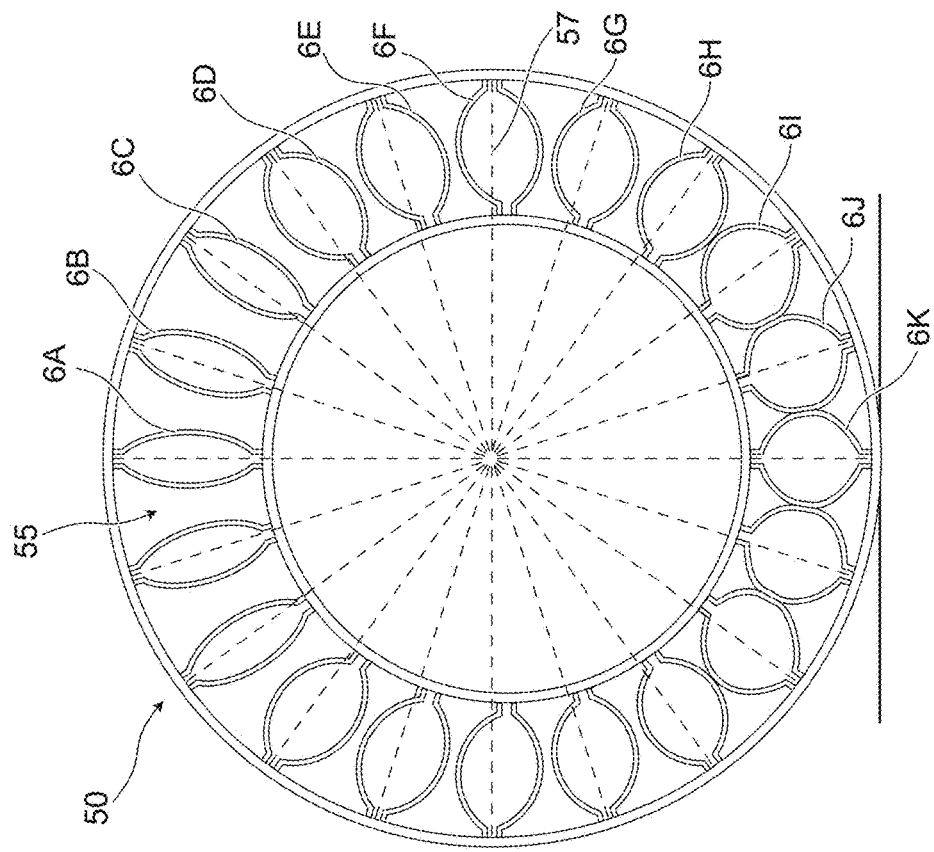
Figure 9C:
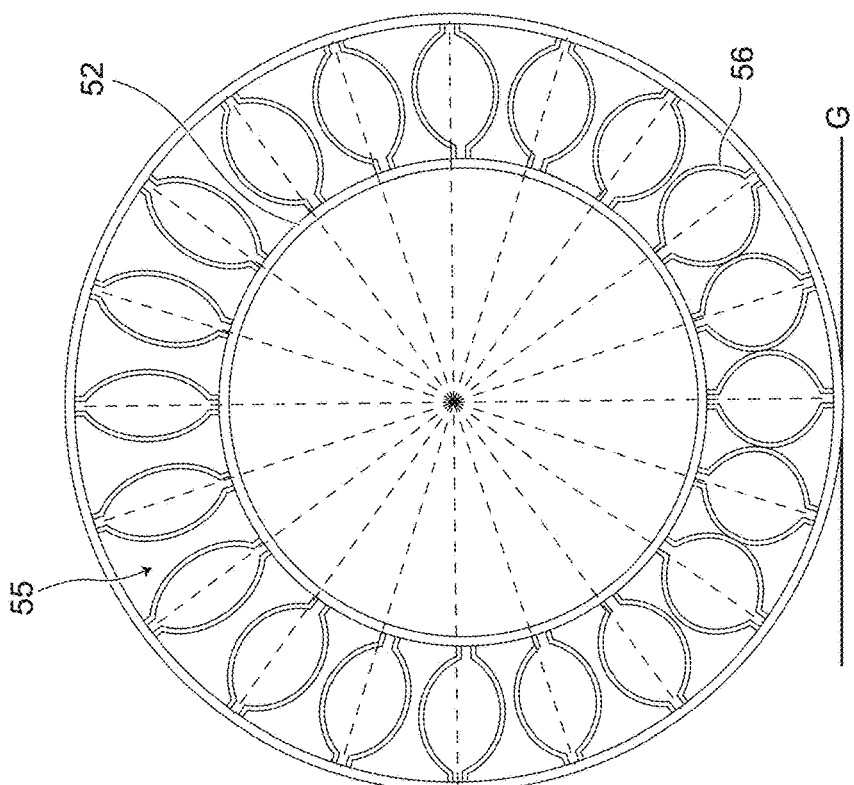

FIGS. 10A-10K correspond to elements 6A-6K in FIG. 9D. Each of those elements is illustrative of the elements across their respective centerline 57. Each of the elements 10A-10K on the right side of wheel 50 is also symmetric with elements on the left side of the wheel, reflected across a vertical axis. Elements shown in FIGS. 10A-10K are each acted on by a force F. At the topmost part of wheel 50, force Facts on the element in pure vertical tension aligned in the radial direction. As the elements go around the wheel, the force component is always vertically down, but skews from the radial direction. This applies the force F to the elements in two components-a radial component acting on the element in either tension or compression, and a circumferential component acting on elements in a shearing direction. Element 6F, being the rightmost element, is acted on in substantially only a shearing direction, and bottommost element shown in FIG. 10K, is acted on substantially only in compression. The shearing components acting on the elements act to move the elements near the bottom of the wheel into contact sooner than elements deflecting under just compression. The spacing, geometry, and material of the elements may all be adjusted to provide a maximum deflection before the elements come into contact with one another and stiffening the resilient interface.

Figure 1:
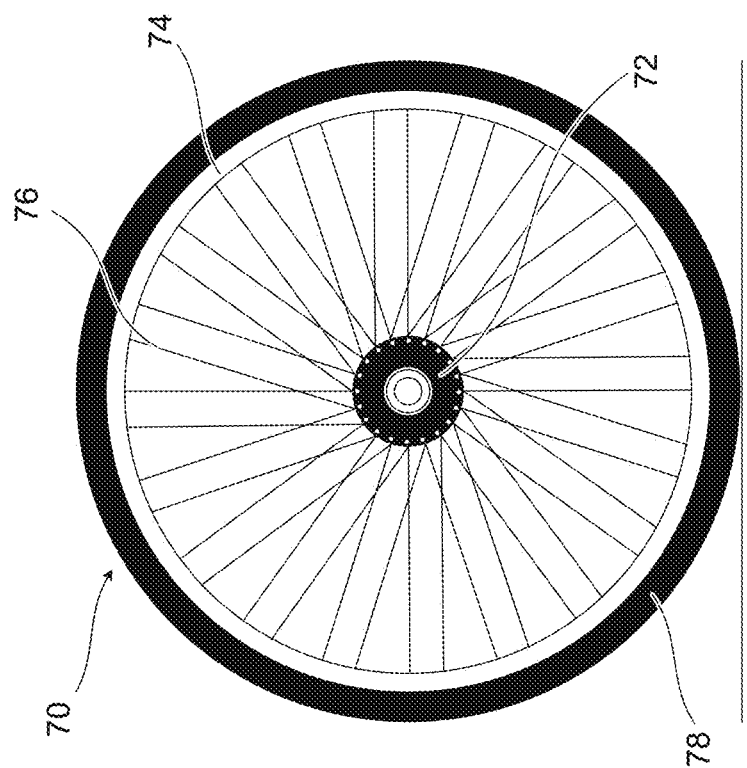
FIG. 1 shows an illustrative diagrammatic view of a pneumatic bicycle wheel assembly of the prior art.

The dramatic stiffening of the resilient interface acts to substantially limit the deflection of the hub, as well as the vehicle attached thereto. Conventional solutions do not have a limiting mechanism to ride height other than bottoming out or reaching the physical limits of the materials used. Tension based wheels, such as the typical bicycle wheel 70 having thin metal spokes 76 shown in FIG. 1, rely most heavily on the spokes' tensile strength as opposed to their strength in compression to support hub 72. The spokes 76 are tightened to remain in tension and stiffen the outer rim 74. This stiffness creates a harsh ride by itself, which may be mitigated by the selection of pneumatic tire 78 or other resilient ground engaging material on the outside rim.

Figure 2:
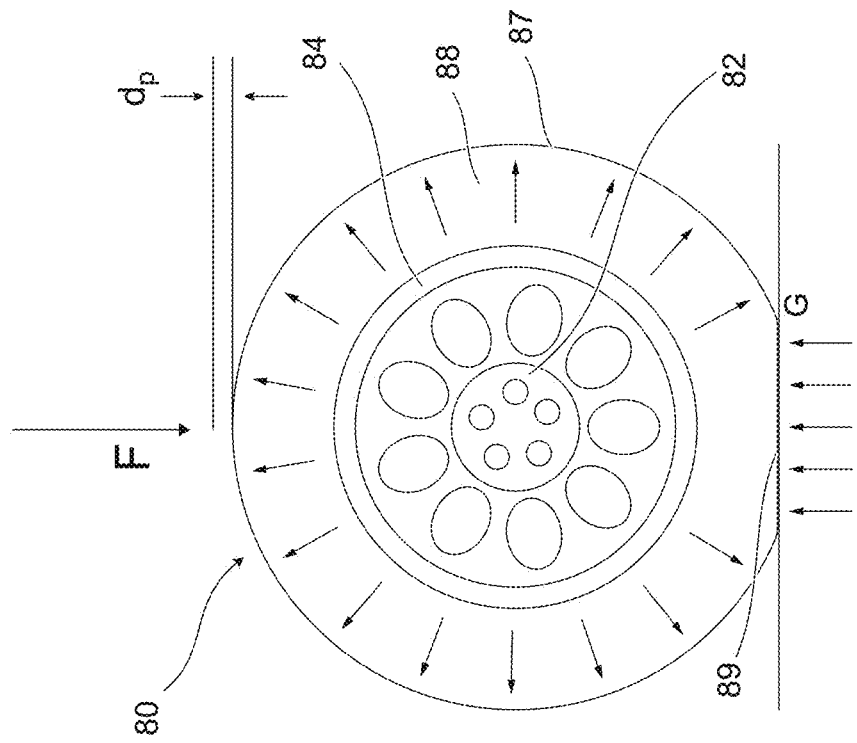
FIG. 2 shows an illustrative diagrammatic view of a pneumatic automotive wheel assembly of the prior art.

FIG. 2 shows the standard pneumatic automotive tire 80. The pneumatic tire 80 is a flexible toroidal structure filled with a compressed gas, typically air. The tire body 88 is made of flexible structural elements, or cords, having a high modulus of elasticity surrounded by a low modulus rubber compound that surrounds the cords and creates a tread 87. The structural elements are attached to the rim 84 of a wheel 80 through a bead that supports the rim when the tire is inflated. The load transmission of the pneumatic wheel is analogous to that of the bicycle wheel of FIG. 1, where the hub hangs on the spokes 76 from the upper part of the rim 74, which is in turn supported at its lower part by the ground G. The inflation pressure causes tension to develop in the cords, depicted by radial arrows, causing them to act like the spokes of the bicycle wheel.

Figure 3:
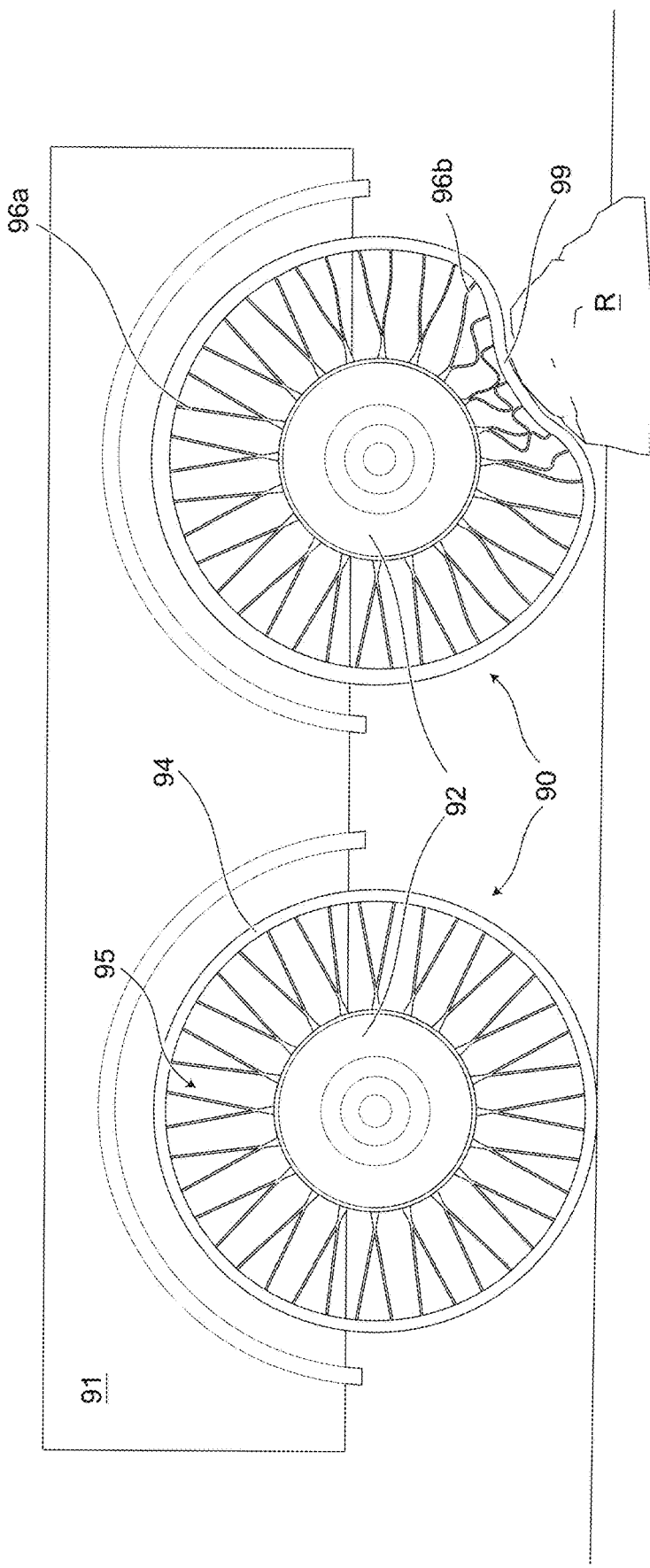
FIG. 3 shows an illustrative diagrammatic side view of a vehicle that includes air-less wheel assemblies of the prior art.

Another top-loaded, or tension-based conventional solution is the wheel assembly roughly depicted in FIG. 3. The wheel assembly includes a wheel 90 with a hub 92, a rim 94, and a resilient interface 95 between and connecting the hub 92 and rim 94. The resilient interface is made of spokes that are strong in tension, with upper spokes 96a supporting the hub 92 like the spokes of a bicycle wheel, but may deform without substantial resistance when under compression like spokes 96b beneath the hub 92. Like the pneumatic tire body, the rim 94 of the wheel 90 is compliant such that encountering an obstacle, such as rock R, allows the wheel to travel over the obstacle without transmitting the force of the impact to the vehicle platform 91.

While the ability for the tire body 88 and rim 94 to deform locally on an outer surface thereof is suitable for circumstances where large obstacles may be readily encountered, in the field of warehousing robotics the driving surface is generally a prepared, flat surface. Wheels traveling over hard, generally flat surfaces do not require large vertical wheel movements or deformations, and are impacted more by rolling resistance and traction compared to wheels designed for unprepared terrain with large obstacles or soft surfaces. Both the pneumatic tire 80 and wheel assembly 90 exhibit generally constant spring rates. As the load continually increases, the deflection will also continually increase.

Figure 4:
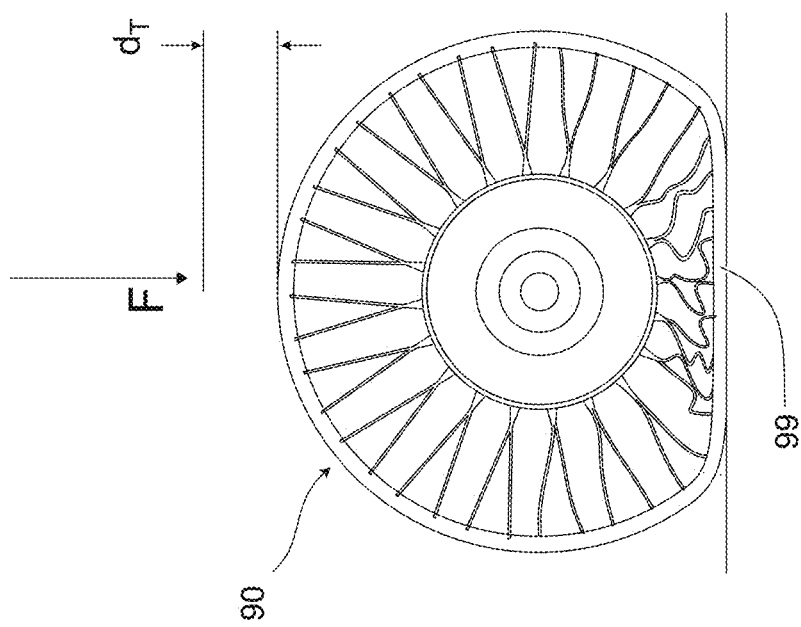
FIG. 4 shows an illustrative diagrammatic view of a wheel assembly of FIG. 3 subjected to a flattening force.

Referring again to FIG. 2, when the wheel 80 is subjected to a force F, the tire body 88 flattens out at its contact patch 89, which causes the wheel to deflect downward an amount dp. Similarly, with reference to FIG. 4, wheel 90 subjected to force F also flattens out at a contact patch 99, causing the wheel to deflect downward an amount dr. In both of these cases, the increased contact patches would reduce the efficiency of the wheels in a warehousing environment, and would continue to deflect downward under increasing loads.

Figure 11:
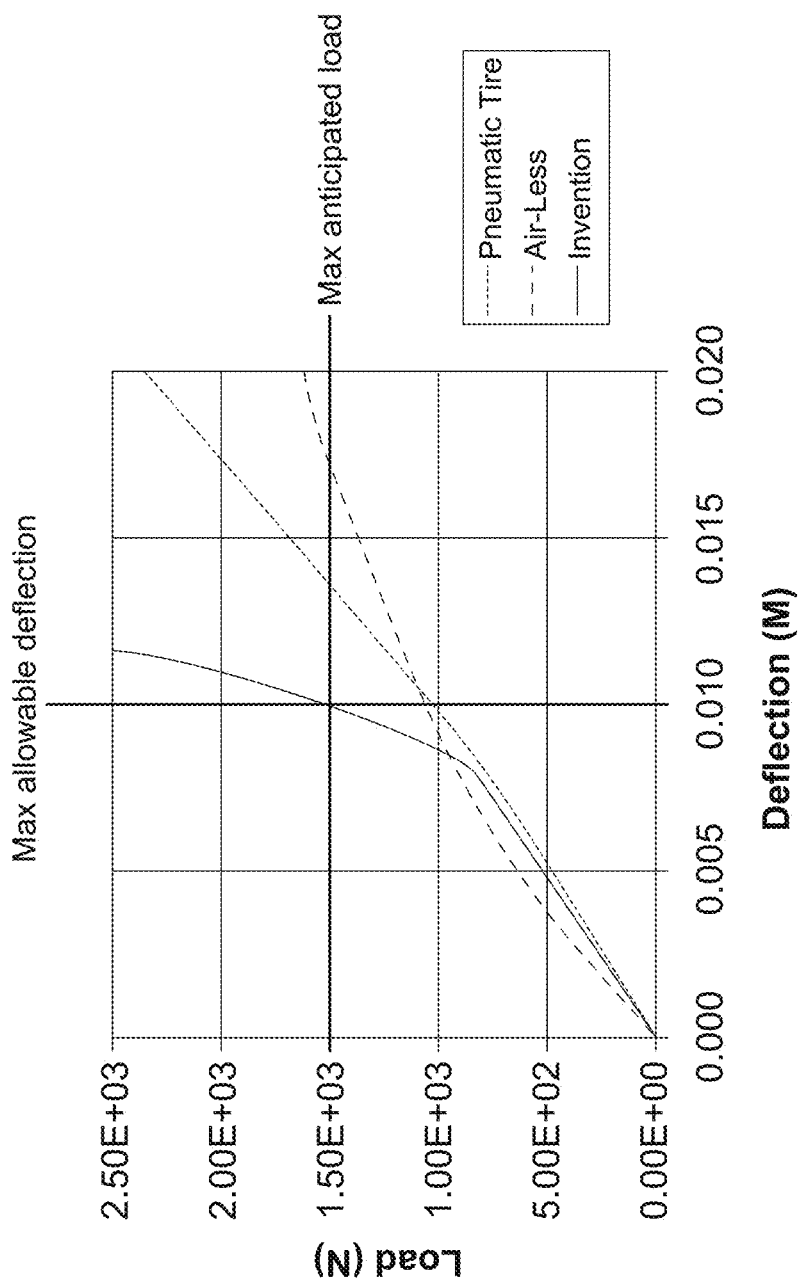
FIG. 11 shows an illustrative diagrammatic graphical representation comparing deflections of various wheel designs under load conditions.

FIG. 11 shows an illustrative graphical representation of the deflection of three types of wheels under varying loads. As can be seen, the dotted line representing a pneumatic tire shows the wheel compressing essentially linearly as the load increases. The wheel assembly 90 on the other hand, represented by the dashed line, becomes less stiff as the load increases, as more spokes buckle and are unable to support the hub. A wheel in accordance with an aspect of the present invention, represented as the solid line, is linear to a point, becomes much stiffer at a threshold deflection, and becomes stiffer as load increases as more resilient elements make contact with adjacent elements increasing the effective spring constant of the resilient interface.

In warehousing environments, a maximum anticipated load can be known, as well as a maximum allowable deflection that allows for proper loading and unloading of objects onto and from shelving or conveyors, for example. As seen in the graph of FIG. 11, both the pneumatic tire and wheel assembly 90 exceed the maximum allowable deflection threshold at the maximum anticipated load.

Figure 12:
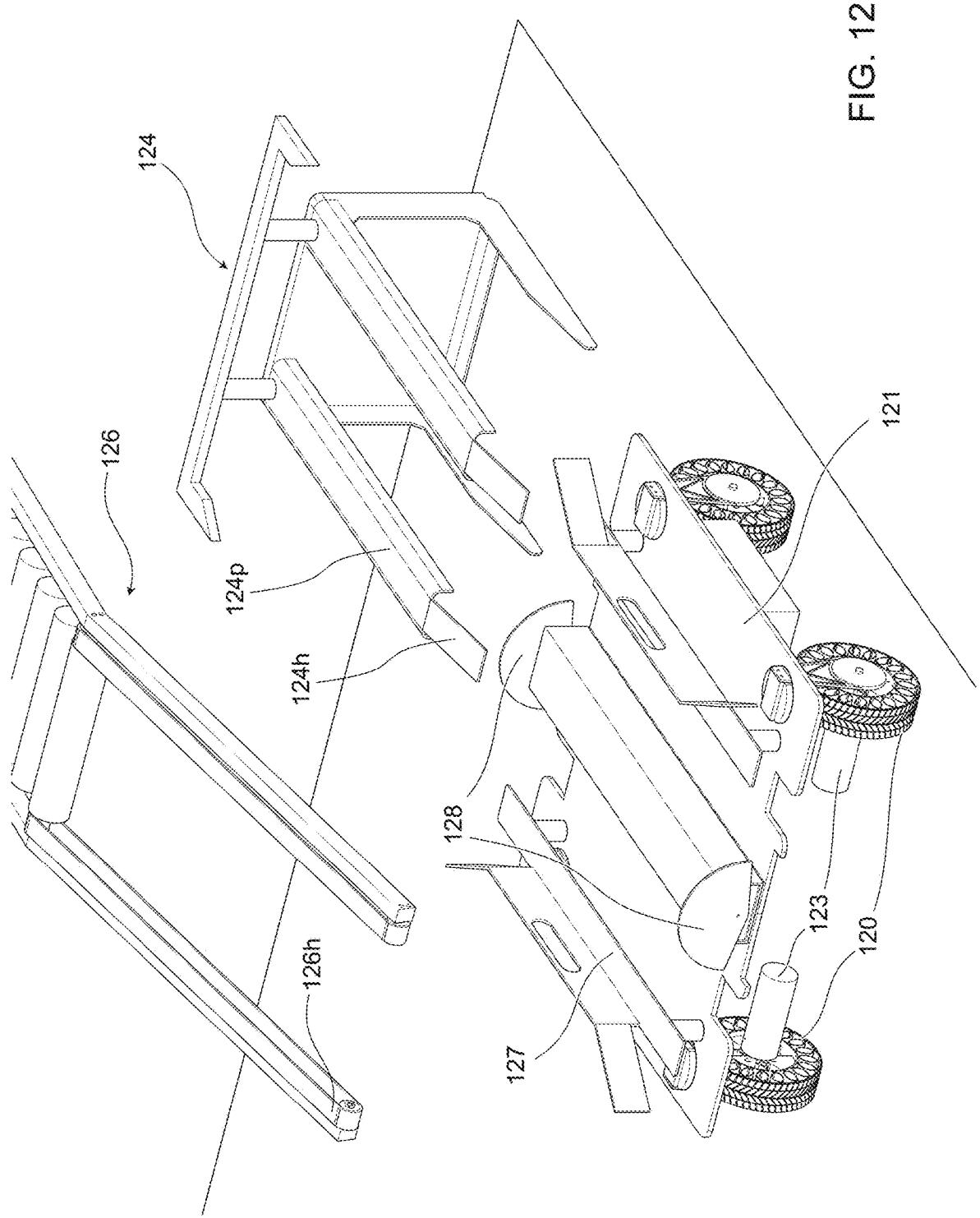
FIG. 12 shows an illustrative diagrammatic isometric view of a mobile device with wheels in accordance with an aspect of the invention in a warehouse setting.

As shown in FIG. 12, a warehouse may include shelves 124, conveyors 126, and mobile devices (e.g., robot vehicles) 121. Shelves have a platform 124p to hold bins or boxes, and a ramp portion 124h that defines the minimum loading height. Likewise, ramp 126 has a ramp portion 126h that defines a minimum loading height for the ramp. These minimum loading heights determine what the maximum allowable deflection may be for the vehicle 121. Vehicle 121 has a pair of platform rails 127 that hold the bins or boxes being transported. Paddles 128 can be actuated to turn upwards as shown in FIG. 12 to maintain an object on the platform rails 127, or can be individually activated to assist in loading and unloading objects onto the shelves 124 or conveyors 126. Vehicle 121 is supported by wheels 120, and powered by motors 123.

Figure 13A:
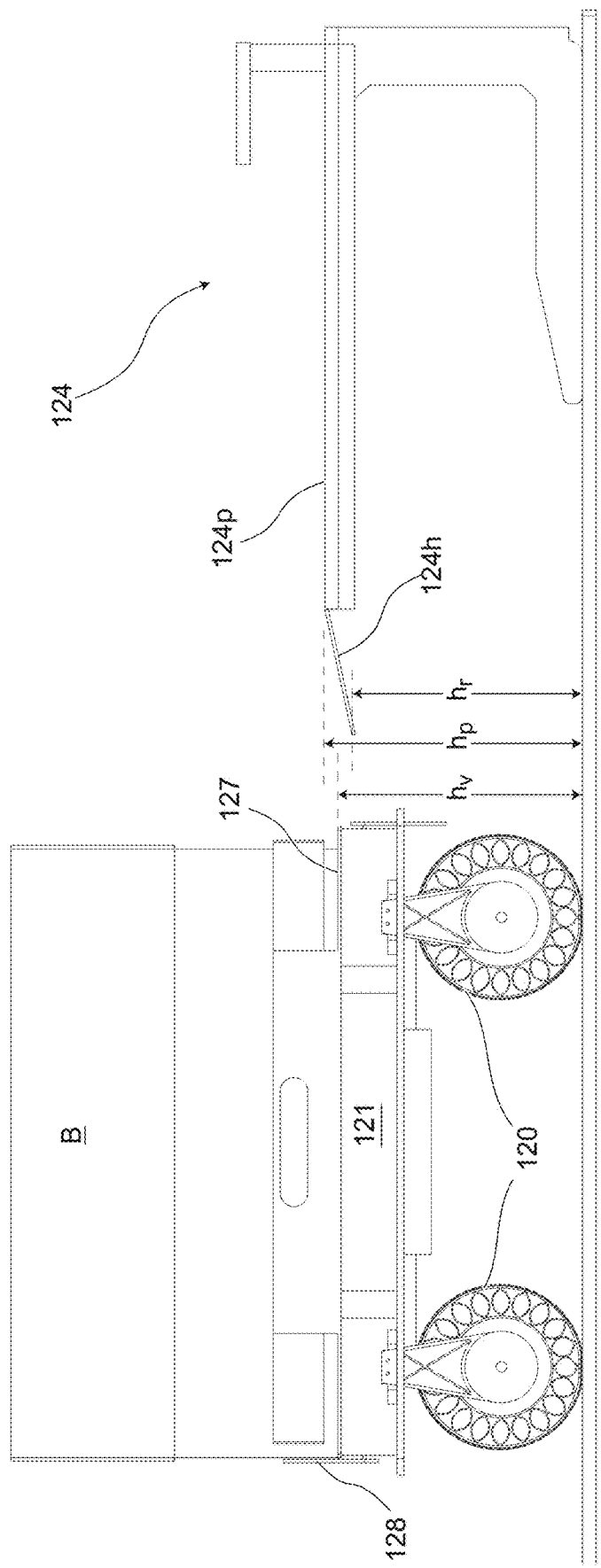
FIGS. 13A-13D show illustrative diagrammatic side views of a mobile vehicle loading (FIG. 13A) a box onto, and unloading (FIG. 13B-13D) a box from, a shelf in the warehouse setting of FIG. 12.

FIG. 13A shows a side view of mobile device (e.g., robot vehicle) 121 approaching a shelf 124. Vehicle 121 is carrying a box B causing wheel 120 to compress. As a result, the height $h_v$ of the vehicle platform 127 is lower than its unloaded state. For box B to be successfully loaded onto the shelf 124, vehicle height $h_v$ must be between the height $h_p$ of the shelf platform 124p and the minimum height $h_r$ of the platform ramp 124h. If the vehicle height $h_v$ is above the height $h_p$ of the shelf platform 124p, the vehicle 121 would be unable to unload the box B as it relies on the paddle 128 to push the box up the ramp 124h to rest on the shelf platform 124p. Otherwise the box B would remain on the vehicle 121. If the vehicle height $h_v$ is below the height $h_r$ of the shelf ramp 124h, the vehicle 121 would be unable to unload the box B as the leading edge of the box B would be below the shelf ramp 124h, and could not slide up onto the shelf platform 124p.

Figure 13B:
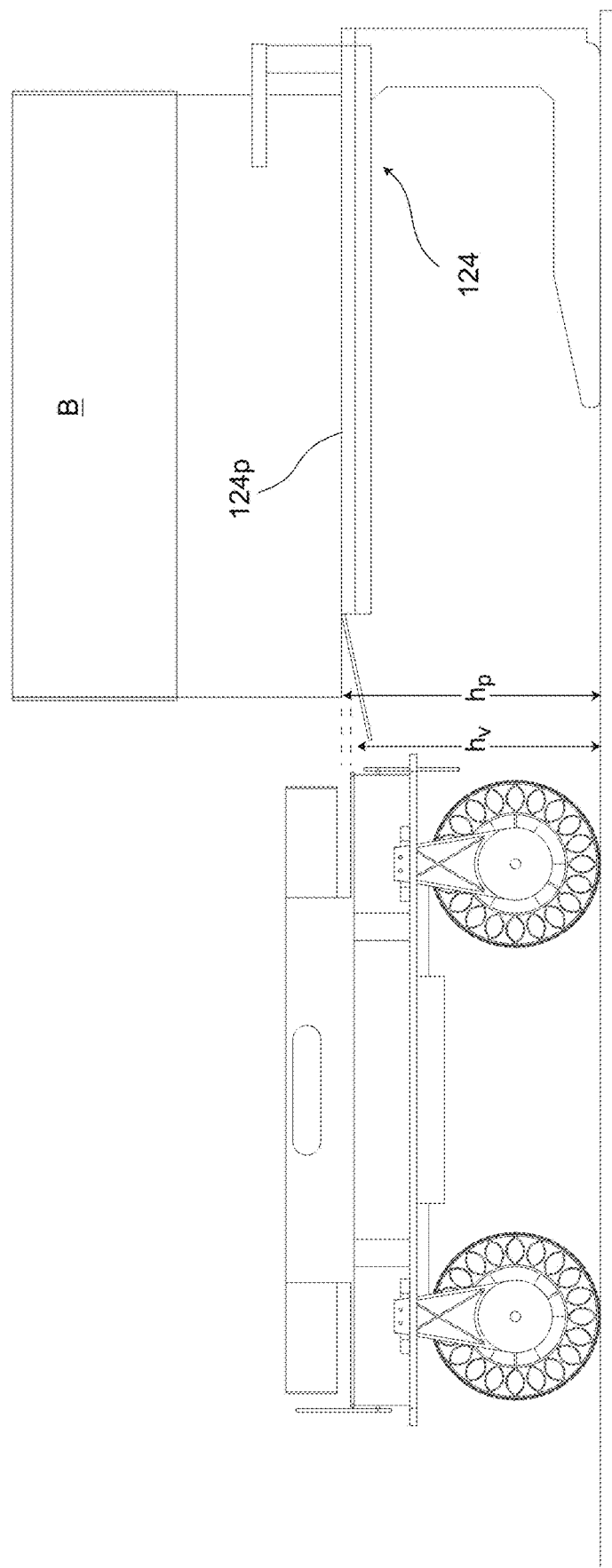
Figure 13C:
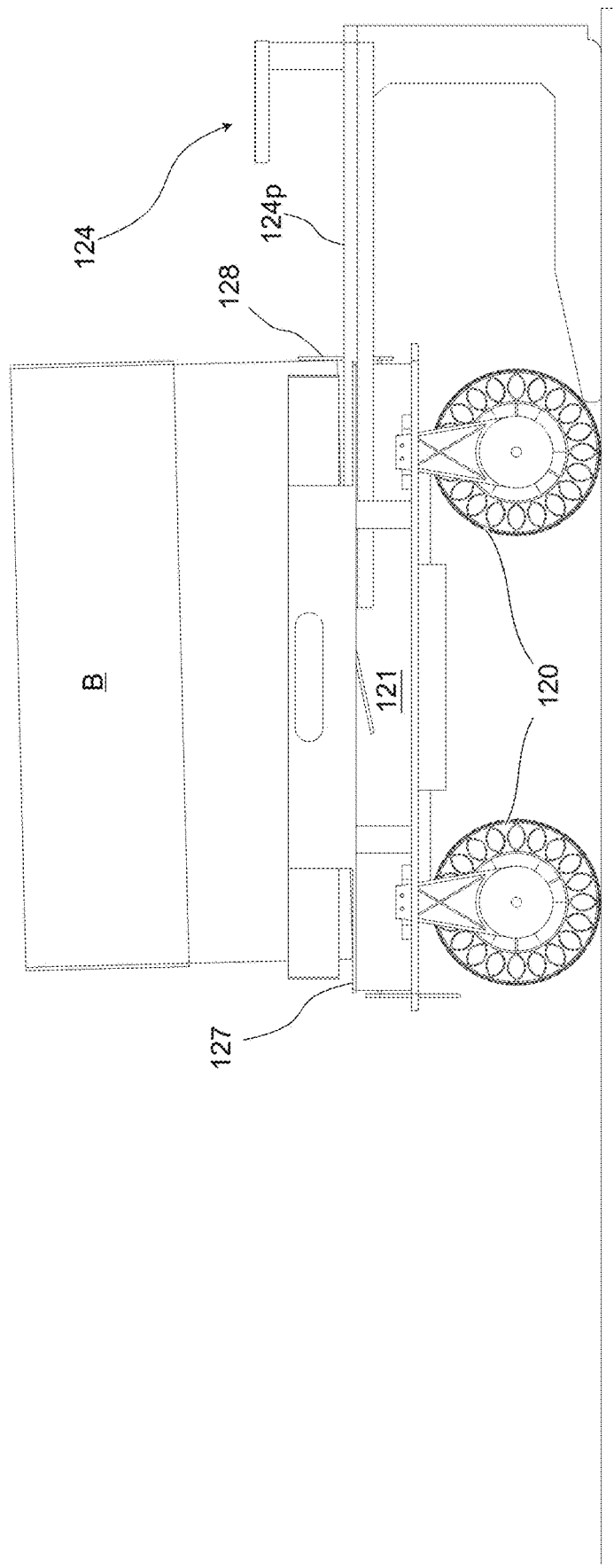
Figure 13D:
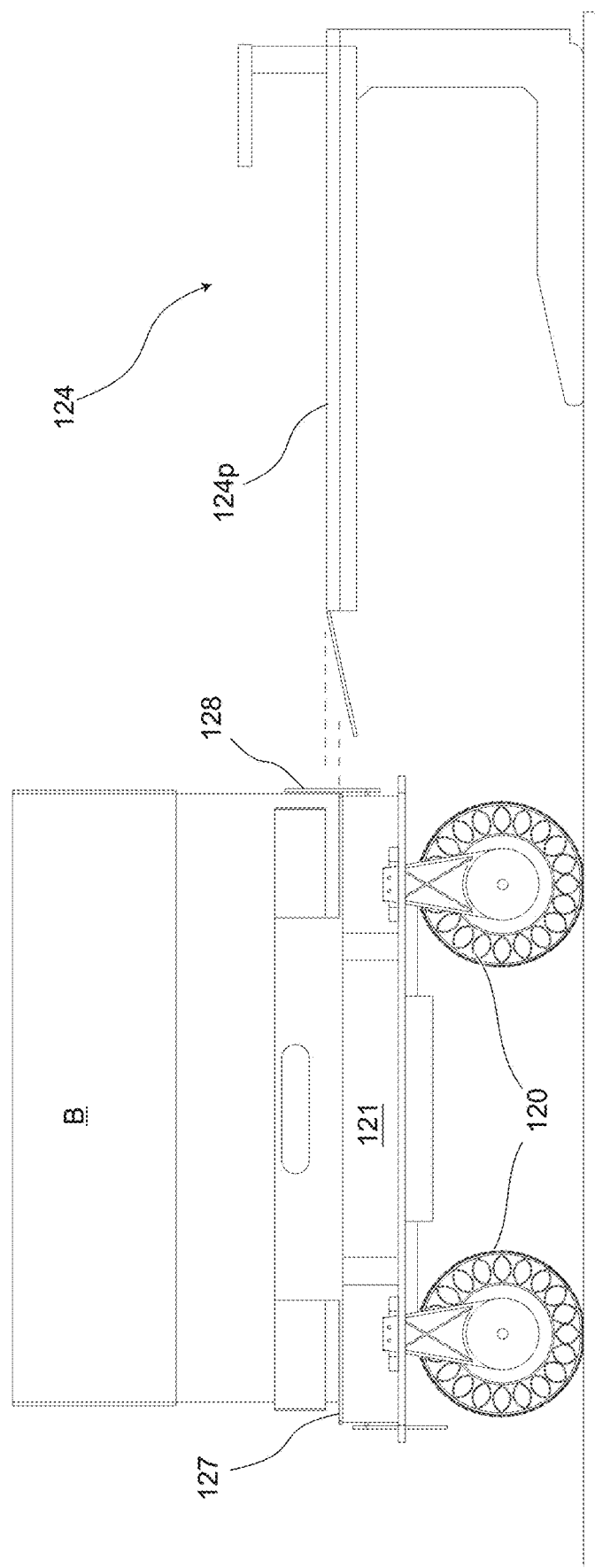

FIG. 13B shows the vehicle 121 after it has unloaded box B onto the shelf platform 124p. Once the box B has been unloaded, the wheels 120 revert to their unloaded state, raising the vehicle height $h_v$ to an unloaded height that must be below the height $h_p$ of the shelf platform 124p. If the vehicle platform rebounded to a height at or above the platform height $h_p$, the vehicle platform 127 would drag the box B at least partially off the shelf 124. Maintaining the unloaded vehicle height to be less than the shelf platform height allows the vehicle to drive under the shelf 124, turn a paddle 128 up to engage the box B, and pulled off the shelf platform 124p as shown in FIGS. 13C and 13D.

Figure 14:
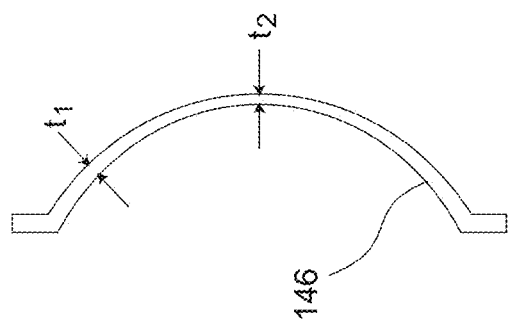
FIG. 14 shows an illustrative diagrammatic view of a resilient element of a wheel in accordance with another aspect of the invention having variable thickness.

Vehicle height dynamics may be customized to allow for a relatively soft unloaded state while still increasing stiffness significantly once a critical deflection is achieved. FIG. 14 shows a resilient element 146 that varies from a first thickness $t_1$ near the ends of the elements to a second thickness $t_2$ at the peak of the element. As seen in the equation above for spring constants, the spring constant k is proportional to the thickness taken to the third power. Therefore, as the element deflects and contacts an adjacent element, the spring constant of the element will increase both because the length of the spring segments has been roughly halved, but also because the thickness is increasing as the peaks flatten against one another.

Figure 15:
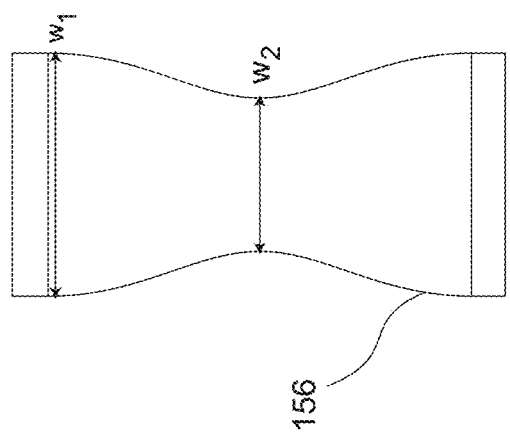
FIG. 15 shows an illustrative diagrammatic view of a resilient element of a wheel in accordance with a further aspect of the invention having variable width.

Similarly, but less dramatically, the spring constant of the element 156 may be customized by changing the width of the element along its length. In FIG. 15, element 156 is at a maximum width $w_1$ at the ends of the element, with a minimum width $w_2$ at the center of the element. The spring constant is directly proportional to element width, which will increase as elements 156 contact adjacent elements. In addition to element thickness and width, the spacing, shape, material, and interaction between adjacent elements may be modified to customize ride height characteristics.

Figure 16:
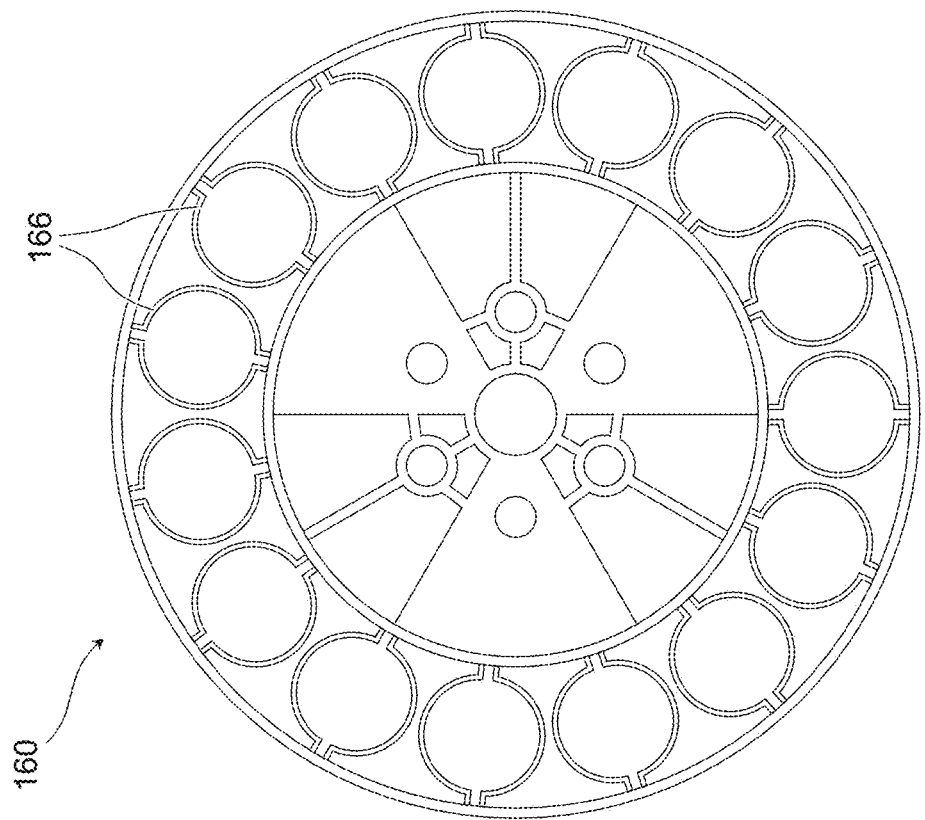
FIG. 16 shows an illustrative diagrammatic side view of a wheel in accordance with another aspect of the invention that includes resilient elements forming a more rounded shape than those of the wheel in FIG. 5.

FIG. 16 shows an aspect of the invention that includes with a wheel 160 that has resilient elements 166 with a more pronounced curve than the wheel of FIG. 5. A more pronounced curve translates into less lateral motion of the curve's peak, and more motion in the tensile/compressive directions. This provides a softer ride under no or light loads, a low critical load as deflection will occur under lighter loads.

Figure 17:
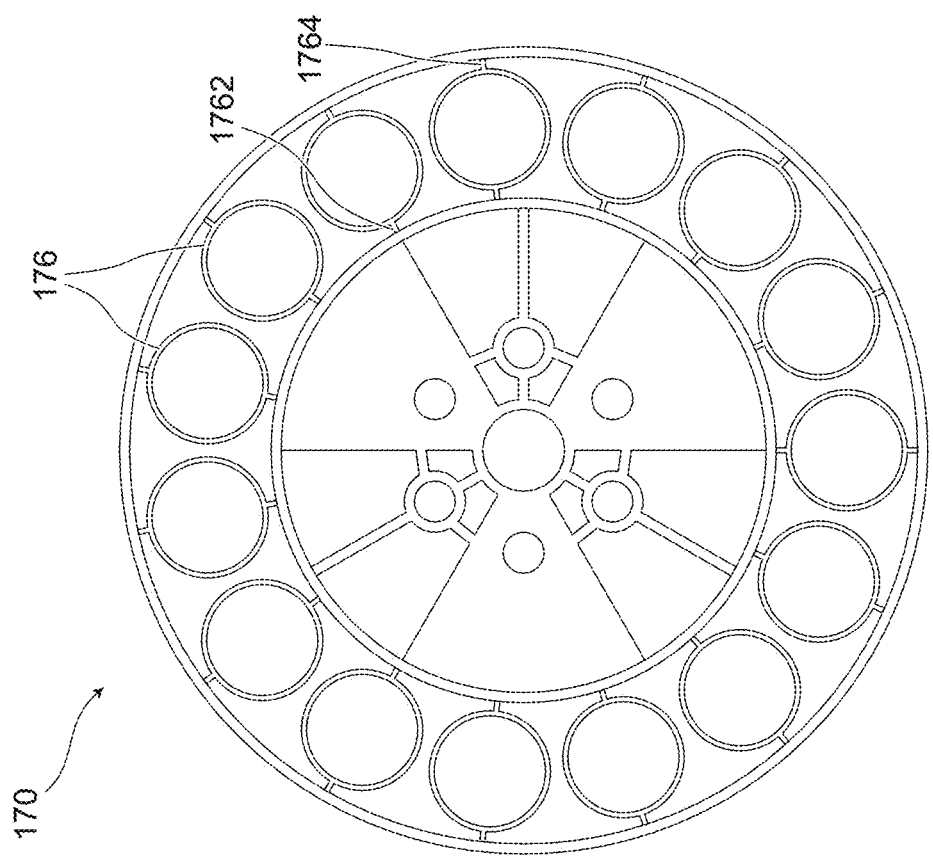
FIG. 17 shows an illustrative diagrammatic side view of a wheel in accordance with a further aspect of the invention that includes resilient elements having a fully rounded shape.

FIG. 17 shows a wheel 170 with resilient elements 176 having a similar shape to the elements 166 of wheel 160, but the adjacent, non-contacting elements share a hub connection portion 1762 and rim connection portion 1764. This connection places more stress on the connection points, but otherwise is still able to deflect and contact adjacent elements.

Figure 18B:
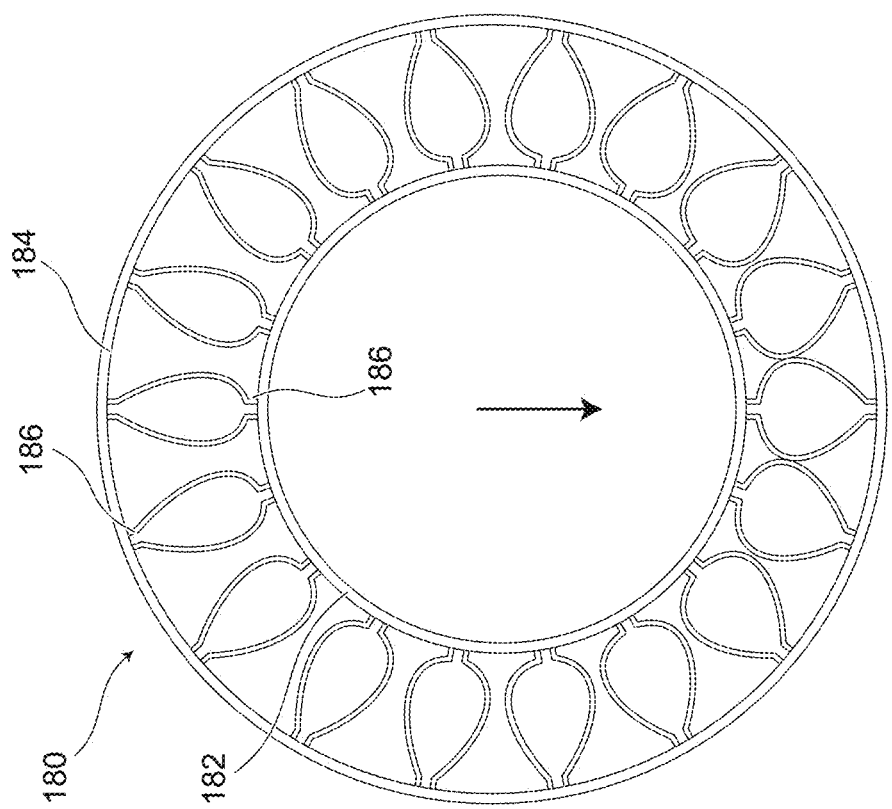
FIGS. 18A and 18B show illustrative diagrammatic side views of a wheel in accordance with another aspect of the invention that includes resilient elements forming an asymmetric shape as compared to those of the wheel in FIG. 5 at rest (FIG. 18A) and under a load condition (FIG. 18B)
Figure 18A:
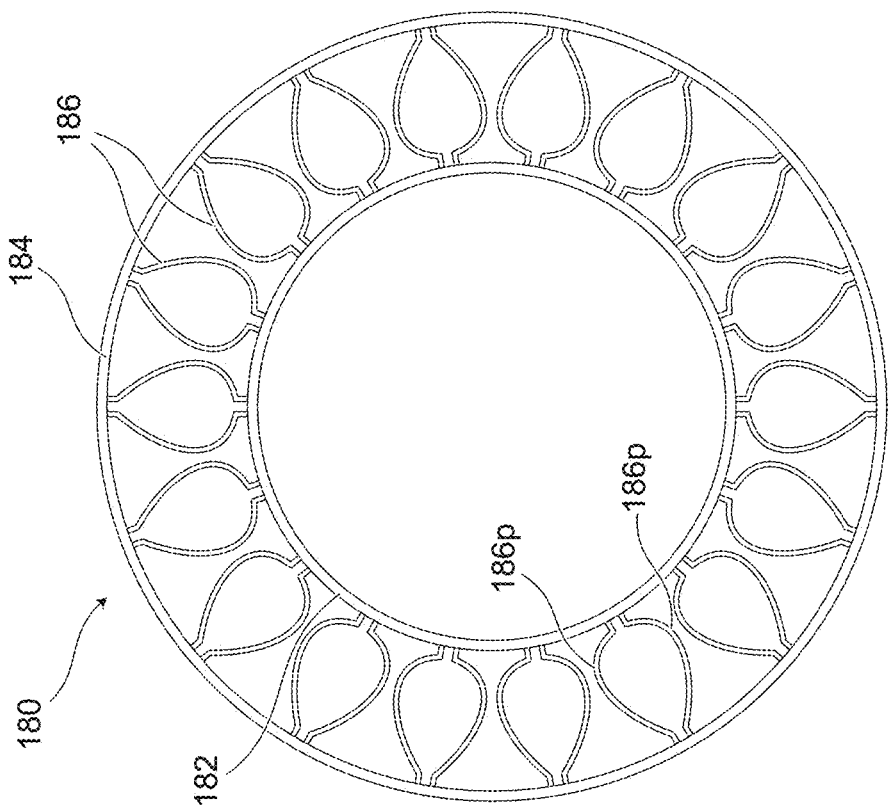

FIGS. 18A and 18B show aspects of the invention with wheel 180 having curved elements 186 with the curve's peak 186p located closer to the hub 182 than the rim 184. The peaks 186p of elements 186 will contact one another sooner under a shorter deflection in the direction of the arrow in FIG. 18B.

Figure 20A:
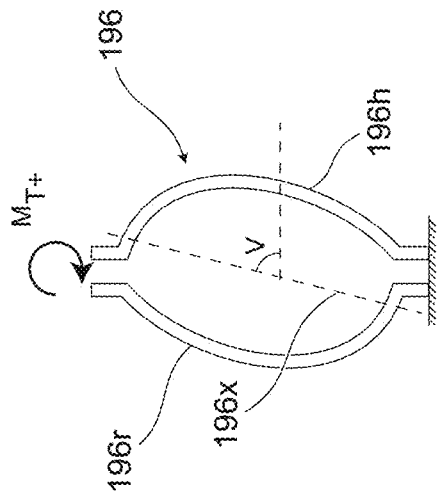
FIGS. 20A and 20B show illustrative diagrammatic side views of a resilient element of the wheel of FIG. 19 with differently directed moment forces being applied to the resilient element.
Figure 20B:
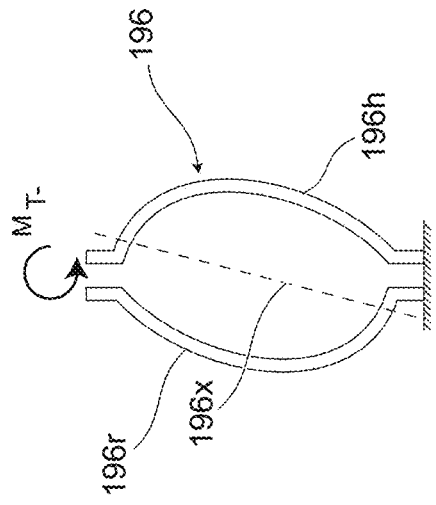
Figure 19:
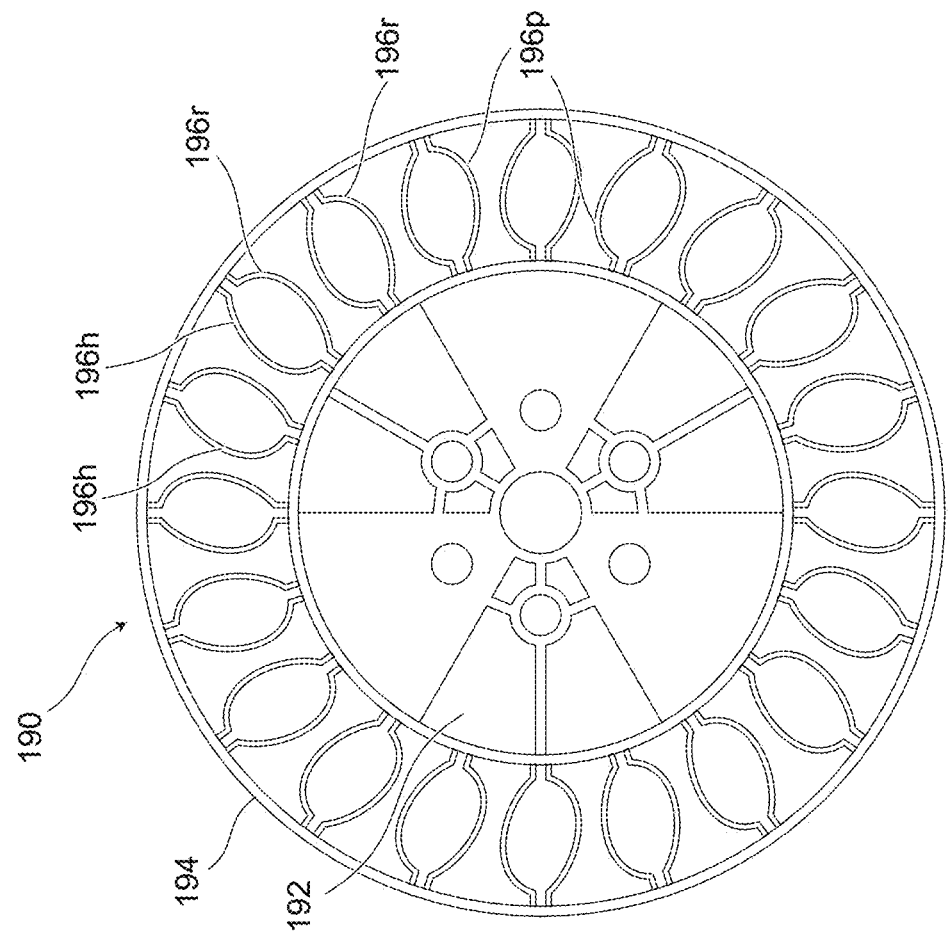
FIG. 19 shows an illustrative diagrammatic side view of a wheel in accordance with a further aspect of the invention that includes directionally-shaped resilient elements.

FIG. 19 shows an aspect of the invention where wheel 190 has alternating resilient elements, with elements 196h having a peak 196p closer to the hub 192 than to the rim 194, and elements 196r having a peak 196p closer to the rim 194 than to the hub 192. Adjacent elements that curve away from one another define a generally elliptical shape therebetween, the elliptical shape having a major axis that is tilted at an angle V as shown in FIG. 20A. This creates a directionality, having a different energy transfer when a moment $M_{T+}$ is applied to the elements as in FIG. 20A than when a moment $M_{T+}$ is applied as shown in FIG. 20B.

The torque applied to the resilient elements transfers the torque to the rim through moments applied to the elements. The ability of the elements to resist moments translates into more efficient and immediate transfer of energy to the outer rim. When a clockwise moment is applied to the elements 196, the energy transfer is more direct, resulting in less deflection of the elements. Efficient and immediate transfer of energy may be beneficial when there is sufficient traction to propel the vehicle. In cases where maintaining traction is problematic, such as when driving on smooth services or when loads are light reducing frictional forces, a softer transfer of shearing forces from the hub to the rim may be preferable. In this case, applying a motive force to the hub in the clockwise direction softens the transfer of forces to the ground-engaging surface, allowing a slower transfer of forces to the ground to allow for a buffer to not exceed the static friction threshold. When unpowered, the elements 196 will deform normally to oppose forces due to load or object on the driving surface.

Figure 21:
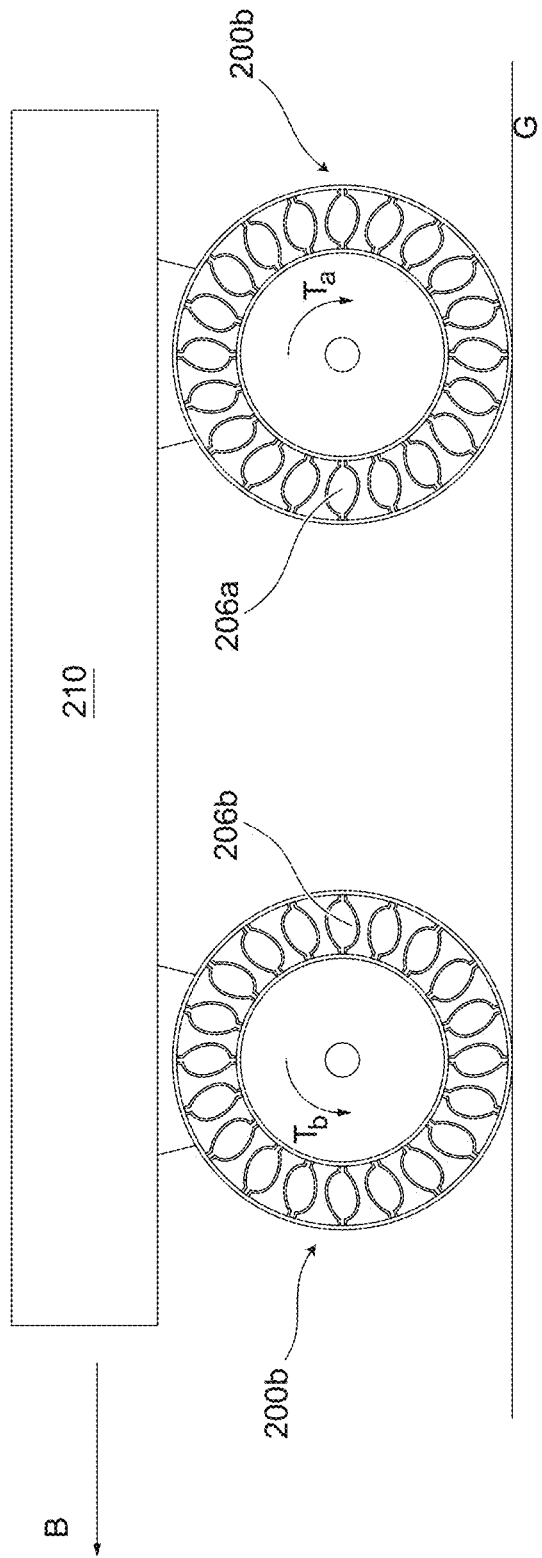
FIG. 21 shows an illustrative diagrammatic side view of a vehicle in accordance with an aspect of the invention that includes wheels as shown in FIG. 19.

Wheels can be installed in opposite directions and powered selectively based on direction of acceleration and braking. As shown in FIG. 21, when vehicle 210 moves in the B direction, wheels 200a can apply torque to the hub in a counter-clockwise direction. This will translate softly to the ground G as the elements deform. Once up to speed, wheels 200b can be powered to provide additional power if needed with less worry of losing traction. When braking, wheels 200b can be used to apply toque in a clockwise direction, softly applying force to the ground G.

The shape of elements 206a and 206b may be tailored to provide a softer start or softer braking by allowing more flexure of the elements as the torque is applied to the hub. This can help prevent wheel slip as the power transfer to the contact area of the tire is applied over a longer time period. Instant power transfer, such as that from electric motors, can result in slipping. Conversely, when slipping isn't a problem, the orientation of the elements can provide firmer power transfer, allowing for faster acceleration or harder braking. If the wheel is not being powered or braking, the elements will act predominantly in the normal direction.

Figure 22:
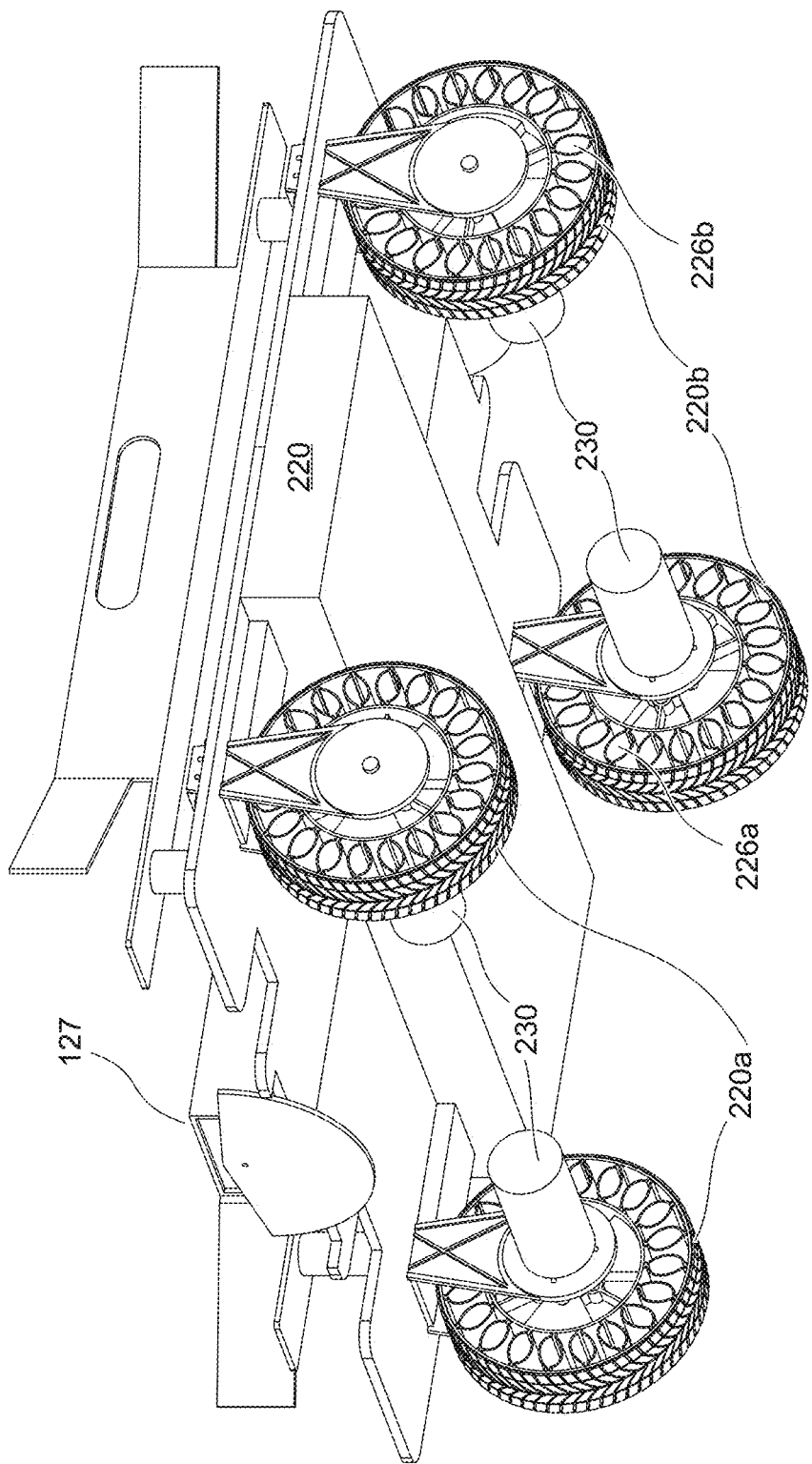
FIG. 22 shows an illustrative diagrammatic underside view of another vehicle in accordance with an aspect of the invention that includes four wheels as shown in FIG. 19.
Figure 23:
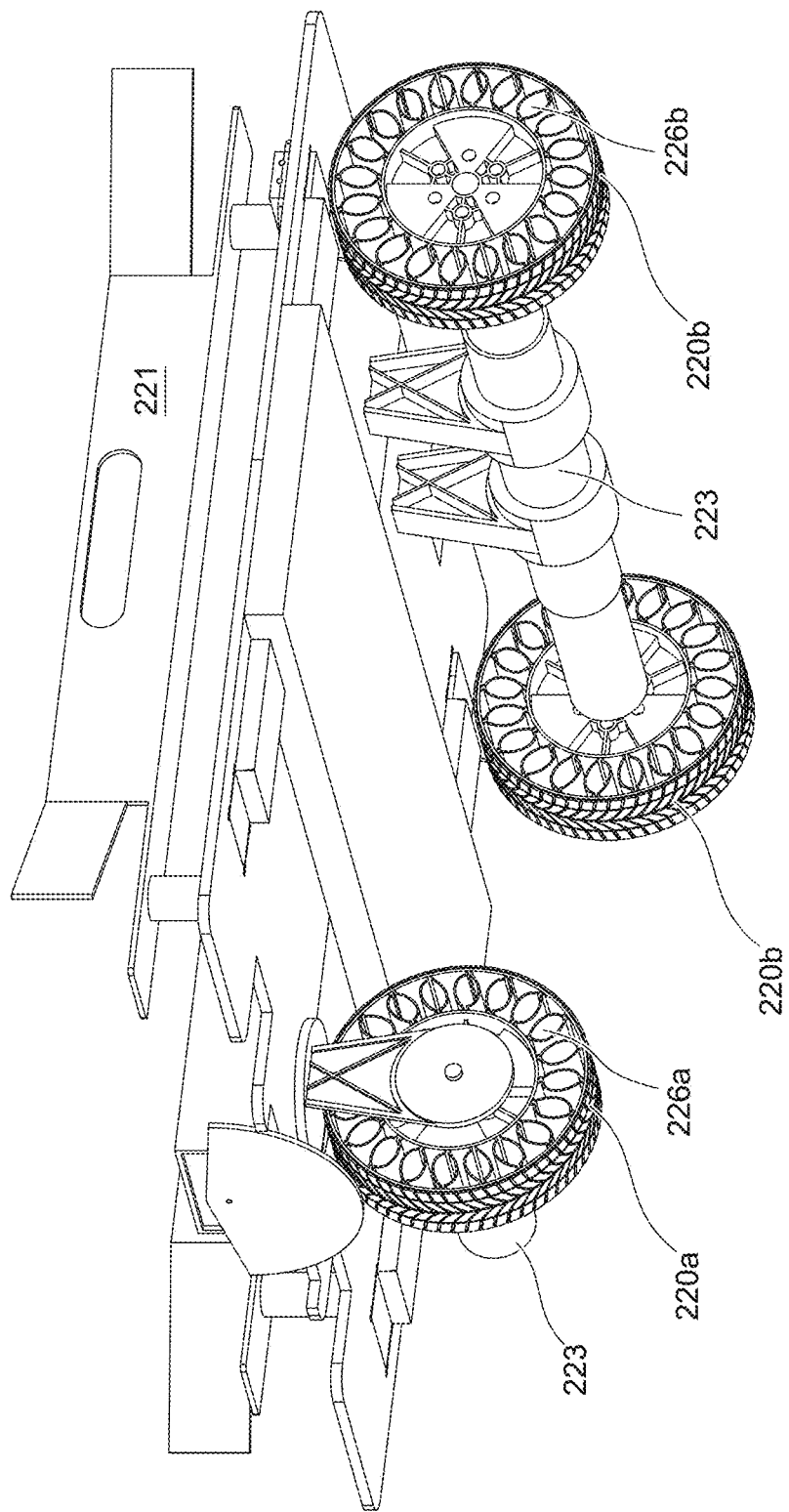
FIG. 23 shows an illustrative diagrammatic underside view of another vehicle in accordance with an aspect of the invention that includes three wheels as shown in FIG. 19. The drawings are shown for illustrative purposes only.

FIGS. 22 and 23 show two types of vehicles employing directional resilient elements. In FIG. 22, vehicle 220 has two sets of wheels 220a and 220b with oppositely directional resilient elements 226a and 226b, respectively. The wheels have motors 230 that may be independently actuated to provide power or braking, as well as being progressively actuated to turn the vehicle using friction turning. In FIG. 23, vehicle 221 has three wheels, with one wheel 220a providing power and turning using motor 223, and two wheels 226b on a common shaft powered by a motor 223.

The materials used for the wheels embodied in the invention is an important design choice. Elastomeric wheels, like those made of urethane, come in a variety of hardnesses. Many wheels used in industrial operations comprise wheels rigidly attached to a vehicle chassis, with rubberized or otherwise resilient ground-engaging materials to provide increased traction. Generally, the less hard the wheel, the greater the traction and vibration or surface-variation compensation. Softer outer surfaces also typically result in increased rolling resistance, requiring greater force to drive and turn, and decreased durability, more readily wearing or delaminating when repeatedly subjected to high shear forces.

For battery operated vehicles, increased rolling resistance leads to more downtime to recharge or swap batteries and greater energy consumption, decreasing the vehicle's operating efficiency. Soft wheels can also peel or delaminate when repeatedly subjected to high lateral forces. Increased wear on the treads also means more downtime and increased cost to replace wheels. The wheel or portions thereof, notably the resilient elements, may be covered in a material that aids in vibrations damping, such as a rubber or other viscoelastic material that can convert motion into heat.

Those skilled in the art will appreciate that numerous variations and modifications may be made to the above disclosed embodiments without departing from the spirit and scope of the present invention.

What is claimed is:

1. A wheel comprising:
   an inner hub;
   an outer rim; and
   a plurality of resilient elements extending in a generally radial direction between the inner hub and the outer rim,
   each of the plurality of resilient elements comprising an arcuate portion arranged between a hub connection portion and a rim connection portion, the hub connection portion of each resilient element connecting to the inner hub and the rim connection portion of each resilient element connecting to the outer rim, the hub connection portion and the rim connection portion of each resilient element being radially aligned, the arcuate portion of each resilient element extending in one of a first circumferential direction and a second circumferential direction, wherein the plurality of resilient elements are arranged in an alternating pattern such that the arcuate portion of each resilient element alternates between extending in the first circumferential direction and the second circumferential direction,
   wherein adjacent resilient elements define an elliptical void therebetween, the elliptical void having a major axis that is angled with respect to the generally radial direction of the adjacent resilient elements, and further wherein each apex of the arcuate portions of the adjacent resilient elements alternates from being closer to the outer rim than to the inner hub and closer to the inner hub than the outer rim, such that power is transferred from the inner hub to the outer rim faster when a rotational direction of the inner hub is in the direction of the major axis than when the rotational direction of the inner hub is opposite the direction of the major axis.

2. The wheel as claimed in claim 1, wherein, upon movement between the hub and the rim up to a threshold distance, one or more resilient elements among the plurality of resilient elements between the inner hub and the outer rim in a direction of a movement are compressed at a first spring rate, and one or more other resilient elements among the plurality of resilient elements between the inner hub and the outer rim opposite the direction of the movement are in tension at the first spring rate.

3. The wheel as claimed in claim 2, wherein, upon movement between the inner hub and the outer rim beyond a threshold distance, the one or more resilient elements between the inner hub and the outer rim in the direction of the movement are compressed at a second spring rate, and the one or more other resilient elements between the hub and rim opposite the direction of the movement are in tension at the first spring rate, wherein the second spring rate is significantly higher than the first spring rate.

4. The wheel as claimed in claim 1, wherein the wheel is formed of a single monolithic structure that is injection molded.

5. The wheel as claimed in claim 1, wherein the wheel is formed of a single monolithic structure that is 3D printed.

6. The wheel as claimed in claim 1, wherein the wheel includes a textured outer tread formed of an elastomeric material.

7. The wheel as claimed in claim 6, wherein the textured outer tread is fitted to an outer surface of the wheel.

8. A wheel interface for a non-pneumatic wheel defining radial and circumferential directions, the wheel interface comprising:
   a plurality of resilient members, each resilient member comprising a curved resilient portion extending in a radial direction from an inner connection portion to an outer connection portion, the inner connection portion and the outer connection portion being radially aligned,
   the curved resilient portion of each resilient member being curved in one of a first circumferential direction and a second circumferential direction, wherein the curved resilient portion of each resilient member that is curved in the first circumferential direction is adjacent the curved resilient portion of another resilient member that is curved in the second circumferential direction,
   wherein the curved resilient portion of each resilient member has a peak defined as an area a maximum distance away from a line going through the inner connection portion and the outer connection portion, wherein, upon compression of any of the plurality of resilient members beyond a threshold deflection, the peak of the curved resilient portion for the compressed resilient member comes into contact with the peak of the curved resilient portion for an adjacent resilient member, and wherein a location of the peak of the curved resilient portion for each resilient member alternates between being closer to the inner connection portion and being closer to the outer connection portion.

9. The wheel interface as claimed in claim 8, wherein the plurality of resilient members exhibit a first generally constant spring rate when compressed to the threshold deflection, and, upon contacting an adjacent resilient member among the plurality of resilient members, exhibit a second generally constant spring rate, the second generally constant spring rate being higher than the first generally constant spring rate.

10. The wheel interface as claimed in claim 8, wherein the plurality of resilient members have a first thickness at the inner and outer connection portions, and a second thickness at the peak, wherein the first thickness is thicker than the second thickness.

11. The wheel interface as claimed in claim 8, wherein the non-pneumatic wheel is formed of a single monolithic structure that is injection molded.

12. The wheel interface as claimed in claim 8, wherein the non-pneumatic wheel is formed of a single monolithic structure that is 3D printed.

13. The wheel interface as claimed in claim 8, wherein the non-pneumatic wheel includes a textured outer tread formed of an elastomeric material.

14. The wheel interface as claimed in claim 13, wherein the textured outer tread is fitted to an outer surface of the non-pneumatic wheel.

15. A non-pneumatic wheel comprising:
a hub defining an axis of rotation of the wheel and having an outer attachment surface;
a rim having an outer ground-engaging surface and an inner attachment surface; and
a plurality of resilient elements extending between the outer attachment surface and the inner attachment surface, each of the plurality of resilient elements having a curved surface having an apex of curvature in a circumferential direction disposed between a hub connection portion and a rim connection portion, the hub connection portion and the rim connection portion of each resilient element being radially aligned, wherein, the plurality of resilient elements are arranged to define pairs of opposed resilient elements spaced circumferentially around the wheel, wherein the opposed resilient elements are curved in generally opposite and facing directions, wherein, upon compression of the plurality of resilient elements as the hub and the rim move towards one another, the curved surfaces of the plurality of resilient elements bow in the circumferential direction of their curvature during a first compression stage, and upon making contact with an adjacent curved surface, begin a second compression stage during which the curved surfaces are prevented from bowing further in the circumferential direction of their curvature, and wherein each apex of curvature of adjacent resilient elements alternates from being closer to the rim than to the hub and closer to the hub than the rim.

16. The non-pneumatic wheel as claimed in claim 15, wherein the plurality of resilient elements exhibit a first spring rate during the first compression stage, and a second spring rate during the second compression stage.

17. The non-pneumatic wheel as claimed in claim 15, wherein torque is applied to the hub to cause the hub to spin about the axis of rotation, wherein the torque is transferred to the rim by the plurality of resilient elements differently in a first rotational direction than a second rotational direction that is opposite the first rotational direction.

18. The non-pneumatic wheel as claimed in claim 15, wherein the non-pneumatic wheel is formed of a single monolithic structure that is injection molded.

19. The non-pneumatic wheel as claimed in claim 15, wherein the non-pneumatic wheel is formed of a single monolithic structure that is 3D printed.

20. The non-pneumatic wheel as claimed in claim 15, wherein the non-pneumatic wheel includes a textured outer tread formed of an elastomeric material.

21. The non-pneumatic wheel as claimed in claim 20, wherein the textured outer tread is fitted to an outer surface of the non-pneumatic wheel.

* * * * *